(12) United States Patent
Hwang

(10) Patent No.: US 12,273,418 B2
(45) Date of Patent: Apr. 8, 2025

(54) METHOD AND SYSTEM FOR PROVIDING WEB CONTENT IN VIRTUAL REALITY ENVIRONMENT

(71) Applicant: Piamond Corp., Busan (KR)

(72) Inventor: Doo Geon Hwang, Busan (KR)

(73) Assignee: Piamond Corp., Busan (KR)

( * ) Notice: Subject to any disclaimer, the term of this patent is extended or adjusted under 35 U.S.C. 154(b) by 0 days.

(21) Appl. No.: 18/475,706

(22) Filed: Sep. 27, 2023

(65) Prior Publication Data
US 2024/0022633 A1 Jan. 18, 2024

Related U.S. Application Data

(63) Continuation of application No. 17/511,758, filed on Oct. 27, 2021, now Pat. No. 11,811,875, which is a continuation-in-part of application No. 17/021,073, filed on Sep. 15, 2020, now Pat. No. 11,182,959.

(30) Foreign Application Priority Data

Jun. 22, 2020 (KR) .................. 10-2020-0075917

(51) Int. Cl.
| | |
|---|---|
| *G06T 19/00* | (2011.01) |
| *G06F 3/0482* | (2013.01) |
| *G06T 11/60* | (2006.01) |
| *G06T 19/20* | (2011.01) |
| *H04L 67/131* | (2022.01) |

(52) U.S. Cl.
CPC .......... *H04L 67/131* (2022.05); *G06F 3/0482* (2013.01); *G06T 11/60* (2013.01); *G06T 19/00* (2013.01); *G06T 19/20* (2013.01); *G06T 2200/24* (2013.01)

(58) Field of Classification Search
CPC ............................... G06T 19/00; G06T 19/20
See application file for complete search history.

(56) References Cited

U.S. PATENT DOCUMENTS

| | | | |
|---|---|---|---|
| 8,407,605 B2 * | 3/2013 | Go | G06F 3/0481 |
| | | | 715/788 |
| 2016/0300392 A1 | 10/2016 | Jonczyk | |
| 2017/0256096 A1 * | 9/2017 | Faaborg | G06T 19/003 |
| 2018/0144556 A1 | 5/2018 | Champion | |
| 2019/0007381 A1 | 1/2019 | Isaacson | |

FOREIGN PATENT DOCUMENTS

KR 20020007892 A 10/2003

\* cited by examiner

*Primary Examiner* — Matthew Salvucci
(74) *Attorney, Agent, or Firm* — Nixon Peabody LLP

(57) ABSTRACT

In rendering, in a virtual reality (VR) space, a web page including a tangible object, an area for a user input is displayed on a browsing window of the web page as an area corresponding to a corresponding tangible object with respect to tangible objects. An interested object according to the user input among the tangible objects is displayed on another browsing window in the VR space by separating the interested object from the web page.

16 Claims, 22 Drawing Sheets

- Real-world Person(using video call),
- Web Object
- Game Environment
- Streaming Channel / Content
- and etc

METHOD AND SYSTEM FOR PROVIDING WEB CONTENT IN VIRTUAL REALITY ENVIRONMENT

CROSS-REFERENCE TO RELATED APPLICATIONS

This application is a continuation of U.S. patent application Ser. No. 17/511,758, filed on Oct. 27, 2021, now allowed, which is a continuation-in-part of U.S. patent application Ser. No. 17/021,073, filed on Sep. 15, 2020, now U.S. Pat. No. 11,182,959, issued on Nov. 23, 2021, which claims priority to Korean Patent Application No. 10-2020-0075917, filed on Jun. 22, 2020, in which each of the above applications is incorporated by reference in its entirety.

BACKGROUND OF THE INVENTION

1. Technical Field

The following description relates to a technology for providing web content in a virtual reality environment.

2. Description of the Related Art

In the existing browsing environment, each of a service provider that operates media for providing services and a third party service provider, that is, an external service provider, writes and uses information on users using its own cookies. For example, the third party service provider exposes information suitable for a user in real time through the media of the third party service provider using programmatic bidding or real-time bidding (RTB) based on information obtained through cookies.

However, in the case of a virtual space, there is a problem in that it is difficult for a third party service provider to effectively collect and check information of the experiences of a user because all the experiences of the user are performed in an environment focused on the supplier of a specific virtual space. Accordingly, in a conventional technology, the third party service provider merely exposes common information to an unspecified number of users regardless of the activities of users in a virtual space or merely provides related information to users based on information external to the activities of the users in a virtual space, such as the profile of a user.

SUMMARY OF THE INVENTION

Embodiments provide a method and system capable of providing web content a virtual reality (VR) environment.

Embodiments provide a method and system capable of using web content in an individual object form not the concept of a window in a virtual reality environment.

Embodiments provide a method and system capable of improving a content search experience using a hyperlink upon web browsing in a virtual reality and metaverse environment.

In an aspect, a method performed by a computer device may include rendering, by at least one processor included in the computer device, in a virtual reality (VR) space, a web page including a tangible object, wherein rendering the web page includes displaying, on a browsing window of the web page, an area for a user input as an area corresponding to a corresponding tangible object with respect to tangible objects; and displaying, on another browsing window in the VR space, an interested object according to the user input among the tangible objects by separating the interested object from the web page.

According to an aspect, rendering the web page may include disposing the browsing window of the web page and the browsing window of the interested object in individual browsing windows in the VR space, respectively.

According to another aspect, rendering the web page may include moving a location of a user agent in the VR space ahead of a new browsing window.

According to a still another aspect, rendering the web page may include moving a previous browsing window in the state in which a location of a user agent has been fixed in the VR space and disposing a new browsing window ahead of the user agent.

According to a still another aspect, rendering the web page may include visualizing a search link relation between the individual browsing windows as a web search path in the VR space by tracking the search link relation.

According to a still another aspect, rendering the web page may include providing at least one of a function for storing information corresponding to at least some search path included in the web search path, a function for editing a search link relation included in the web search path, and a function for closing a browsing window of at least some search path included in the web search path.

According to a still another aspect, the method may further include obtaining, by the at least one processor, a unique URL for the interested object in a communication environment between agents through the VR space and delivering the interested object to a counterpart agent.

According to a still another aspect, the method may further include providing, by the at least one processor, output results for a counterpart agent in a communication environment between agents through the VR space by converting the output results into a format desired by the counterpart agent.

According to a still another aspect, displaying the area for the user input may include selecting the tangible object in the web page by using a tag breakpoint for an individual object unit.

According to a still another aspect, the method may further include providing, by the at least one processor, a focus movement function for moving a focus to a location, corresponding to an input focus of a user, through auto-focusing in response to a movement of the input focus within an area corresponding to the tangible object.

According to a still another aspect, providing the at least one of the functions may include performing auto-focusing by using a metadata tag including priority of an input for a tag capable of a user input.

According to a still another aspect, providing the focus movement function may include providing an auto-complete function for input information according to the input focus.

In an embodiment, a computer device may include at least one processor configured to execute computer-readable instructions included in a memory. The at least one processor may be configured to render, in a virtual reality (VR) space, a web page including a tangible object, to display, in a browsing window of a web page, an area for a user input as an area corresponding to a corresponding tangible object with respect to tangible objects, and to display, on another browsing window in the VR space, an interested object according to the user input among the tangible objects by separating the interested object from the web page.

According to embodiments of the present disclosure, content on the web in a virtual reality environment can be provided in an individual object form.

According to embodiments of the present disclosure, a content search experience using a hyperlink upon browsing in a virtual reality and metaverse environment can be improved.

DETAILED DESCRIPTION

Hereinafter, various embodiments of the present disclosure are described with reference to the accompanying drawings.

Figure 1:
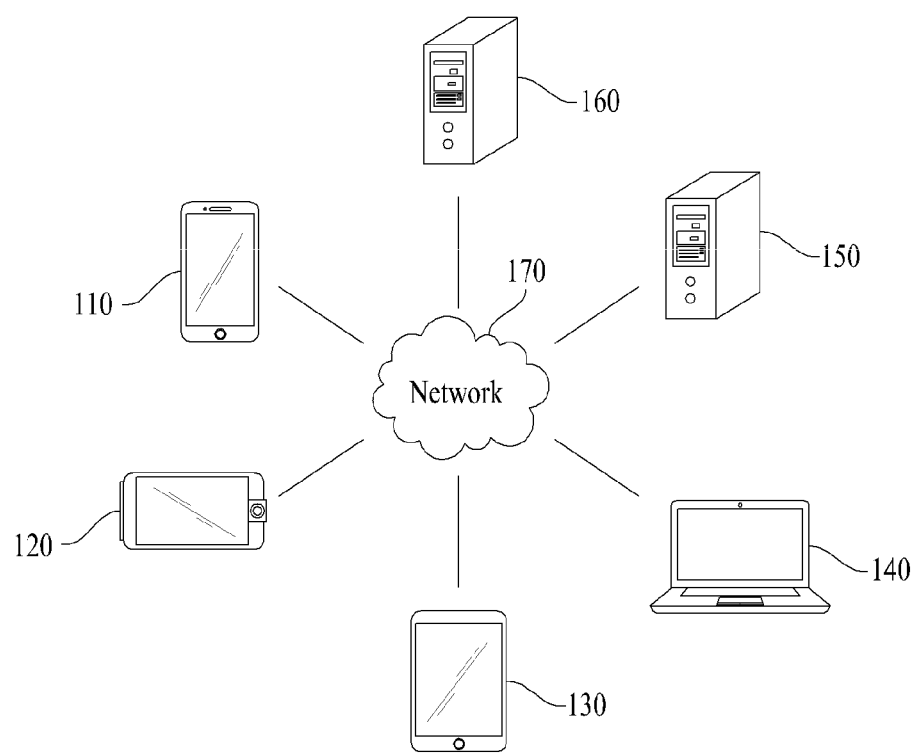
FIG. 1 is a diagram illustrating an example of a network environment according to an embodiment of the present disclosure.

FIG. 1 is a diagram illustrating an example of a network environment according to an embodiment of the present disclosure. FIG. 1 illustrates an example in which the network environment includes a plurality of electronic devices 110, 120, 130, and 140, a plurality of servers 150 and 160, and a network 170. The network environment of FIG. 1 is an example for the description of embodiments, and the number of electronic devices or the number of servers is not limited to those illustrated in FIG. 1. Furthermore, the network environment of FIG. 1 illustrates an example of environments which may be applied to the present embodiments, and an environment which may be applied to the present embodiments is not limited to the network environment of FIG. 1.

The plurality of electronic devices 110, 120, 130, and 140 may be stationary devices or mobile devices implemented as computer devices. The plurality of electronic devices 110, 120, 130, and 140 include a smartphone, a mobile phone, a navigation device, a computer, a laptop computer, a terminal for digital broadcasting, personal digital assistants (PDA), a portable multimedia player (PMP), a tablet PC, etc. In FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices for providing instructions, code, files, contents, or services through communication with the plurality of electronic devices 110, 120, 130, and 140 over the network 170. For example, the server 150 may be a system that provides services (e.g., services based on a virtual space, an instant messaging service, a game service, a group call service (or voice conference service), a messaging service, a mail service, a social network service, a map service, a translation service, a financial service, a settlement service, a search service, and a content provision service).

Figure 2:
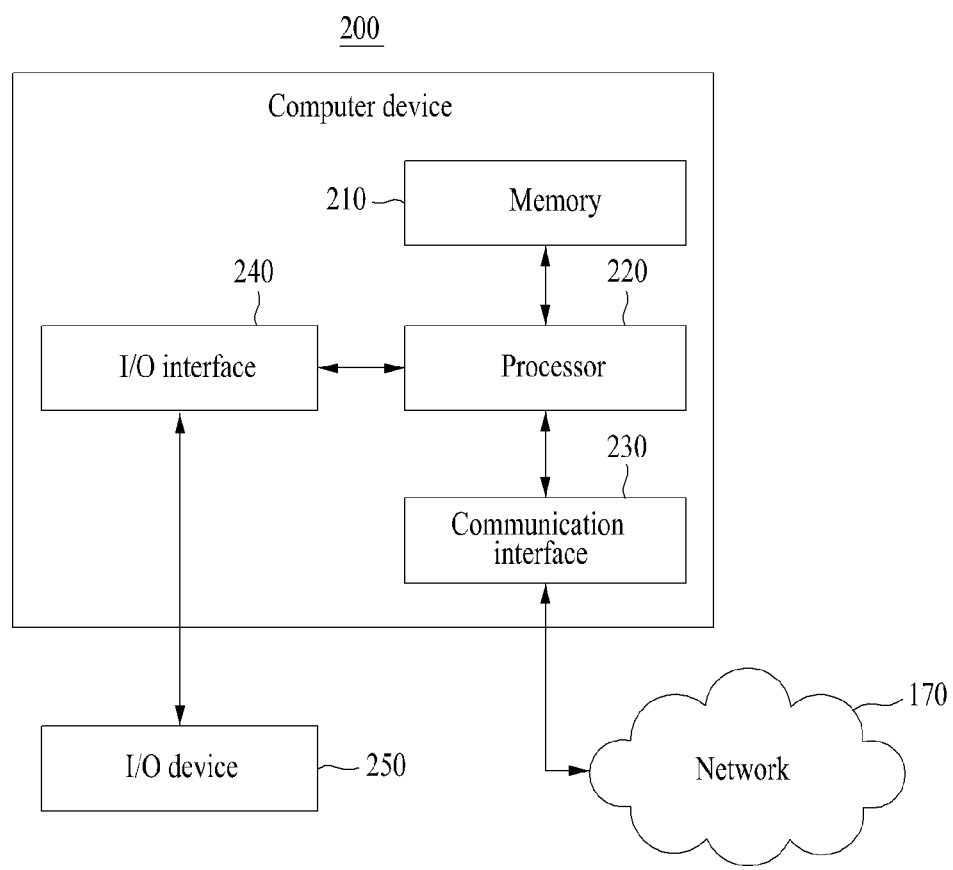
FIG. 2 is a block diagram illustrating an example of a computer device according to an embodiment of the present disclosure.

FIG. 2 is a block diagram illustrating an example of a computer device 200 according to an embodiment of the present disclosure. Each of the plurality of electronic devices 110, 120, 130, and 140 or each of the servers 150 and 160 may be implemented by the computer device 200 illustrated in FIG. 2.

As illustrated in FIG. 2, the computer device 200 may include a memory 210, a processor 220, a communication interface 230, and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating stem and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer device 200 based on a computer program installed by files received over the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices over the network 170. For example, a request, a command, data or a file generated by the processor 220 of the computer device 200 based on program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (the aforementioned permanent storage device) which may be further included in the computer device 200.

The I/O interface 240 may be means for an interface with an input/output (I/O) device 250. For example, the input device may include a device, such as a microphone, a keyboard, a camera or a mouse. The output device may include a device, such as a display or a speaker. For another example, the I/O interface 240 may be means for an interface with a device in which functions for input and output have been integrated into one, such as a touch screen. At least one of the I/O devices 250, together with the computer device 200, may be configured as a single device. For example, the I/O device 250 may be implemented in a form in which a touch screen, a microphone, a speaker, etc. are included in the computer device 200, like a smartphone.

Furthermore, in other embodiments, the computer device 200 may include elements greater or smaller than the elements of FIG. 2. However, it is not necessary to clearly illustrate most of conventional elements. For example, the computer device 200 may be implemented to include at least some of the I/O devices 250 or may further include other elements, such as a transceiver and a database.

Figure 3:
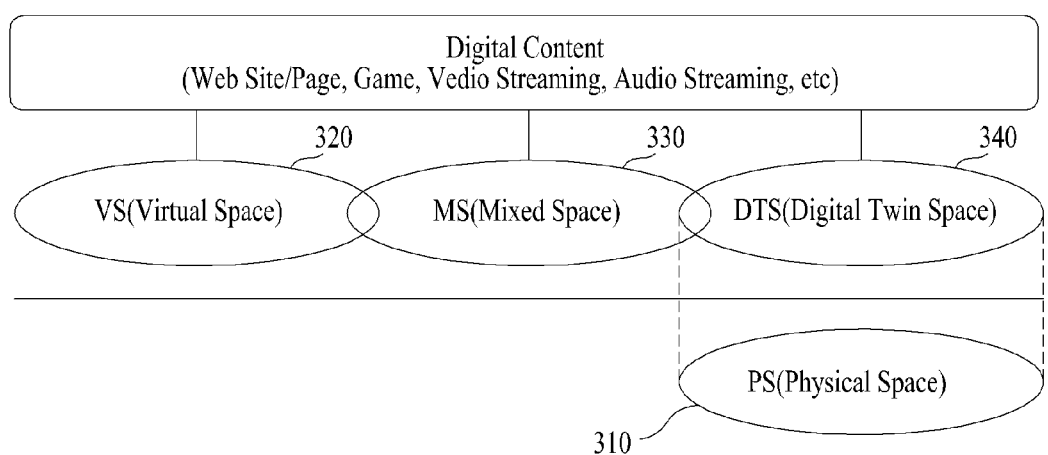
FIG. 3 is a diagram for describing spaces according to an embodiment of the present disclosure.

FIG. 3 is a diagram for describing spaces according to an embodiment of the present disclosure. FIG. 3 illustrates a physical space (PS) 310, that is, a space in the real world, and a virtual space (VS) 320, a mixed space (MS) 330 and a digital twin space (DTS) 340, that is, spaces in a virtual world.

The space in the virtual world may be designed by a supplier (i.e., service provider) of the virtual world or may be configured by a user or a third party service provider, that is, an external service provider. The space in the virtual world may be configured in the form of the VS 320, the MS 330 and/or the DTS 340 depending on a feature of the space. The VS 320 may be a pure digital-based space which may be associated with a cyber physical system (CPS). The DTS 340 may be a space is a real world-based virtual space and associated with the CPS. The MS 330 may be a space in which the VS 320 and the DTS 340 are mixed. The MS 330 may be provided in a form in which an agent, that is, the object of a user, is adaptive to an environment of the real world or may be provided in a form in which an environment of the real world is rendered on the virtual world.

The space in the virtual world is a concept of a basic virtual space where the agent of a user may behave. A policy for the activity, information utilization and/or exposure of an agent may be present for each space. If the agent of a user uses services in a specific space in a virtual world, the user needs to recognize that each piece of personal information and privacy & terms are present depending on the subject of service provision.

The space in the virtual world may be variously generated and used depending on a supplier or a user. To this end, a separate gate may be provided as an interface for a movement of an agent between spaces in the virtual world.

Figure 4:
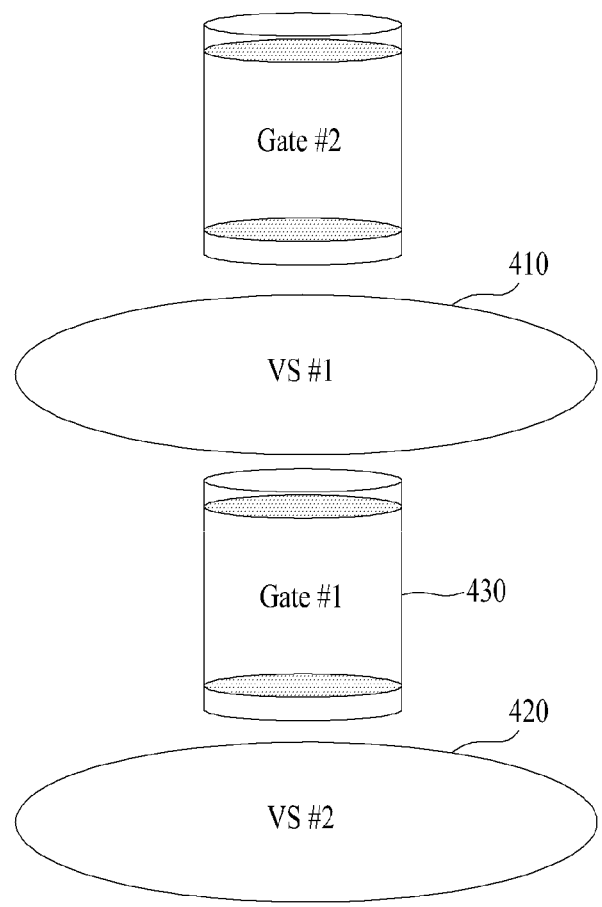
FIG. 4 is a diagram illustrating an example of a movement between spaces in a virtual world according to an embodiment of the present disclosure.

FIG. 4 is a diagram illustrating an example of a movement between spaces in the virtual world according to an embodiment of the present disclosure. FIG. 4 illustrates a gate #1 430 for a movement between a VS #1 410 and a VS #2 420, that is, two virtual spaces. In this case, the gate may be a basic interface for providing a movement between spaces in the virtual world. The gate may also control a movement between a space in the virtual world and a space in a non-virtual world, in addition to a movement between spaces in the virtual world. For example, FIG. 4 illustrates that the agent of the VS #1 410 may also move to a movement target as a space in a non-virtual world, such as a web page, a streaming channel, streaming content, a game environment, or an actual offline video call. A method of distinguishing between spaces in the virtual world may be determined by the supplier of a space in the virtual world.

The agent may mean a user or program in the space in the virtual world. In this case, an agent as a program has a form of an artificial intelligence agent, and may be a virtual avatar or persona present in place of a third party service provider. A physical characteristic of a space in the virtual world to which an agent belongs may be applied to the corresponding agent. A service profile set for the space in the virtual world may be applied to the agent. Furthermore, the agent may have a characteristic based on information of a physical device used by a user. For example, the agent may have a viewing angle based on a display characteristic of a physical device used by a user or may have a control characteristic based on the controller of the corresponding physical device.

Furthermore, a digital object to be described hereinafter is a core element that configures world information in a space in the virtual world, and may collectively refer to objects that provide a mutual interaction function with an agent.

Figure 5:
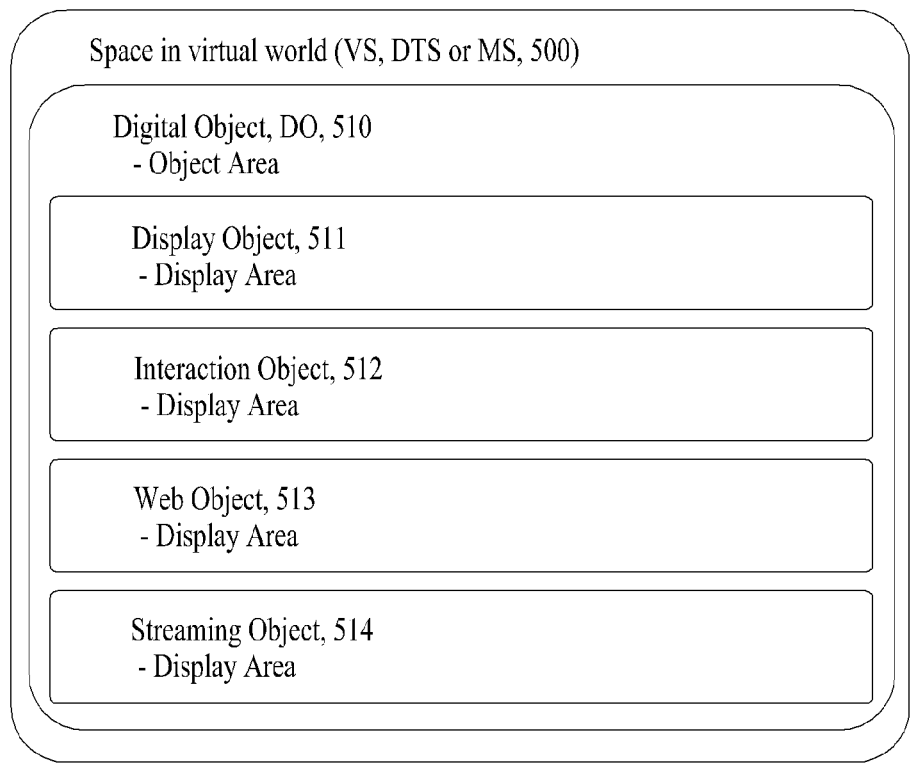
FIG. 5 is a diagram illustrating a relation between elements configuring a space in a virtual world according to an embodiment of the present disclosure.
Figure 6:
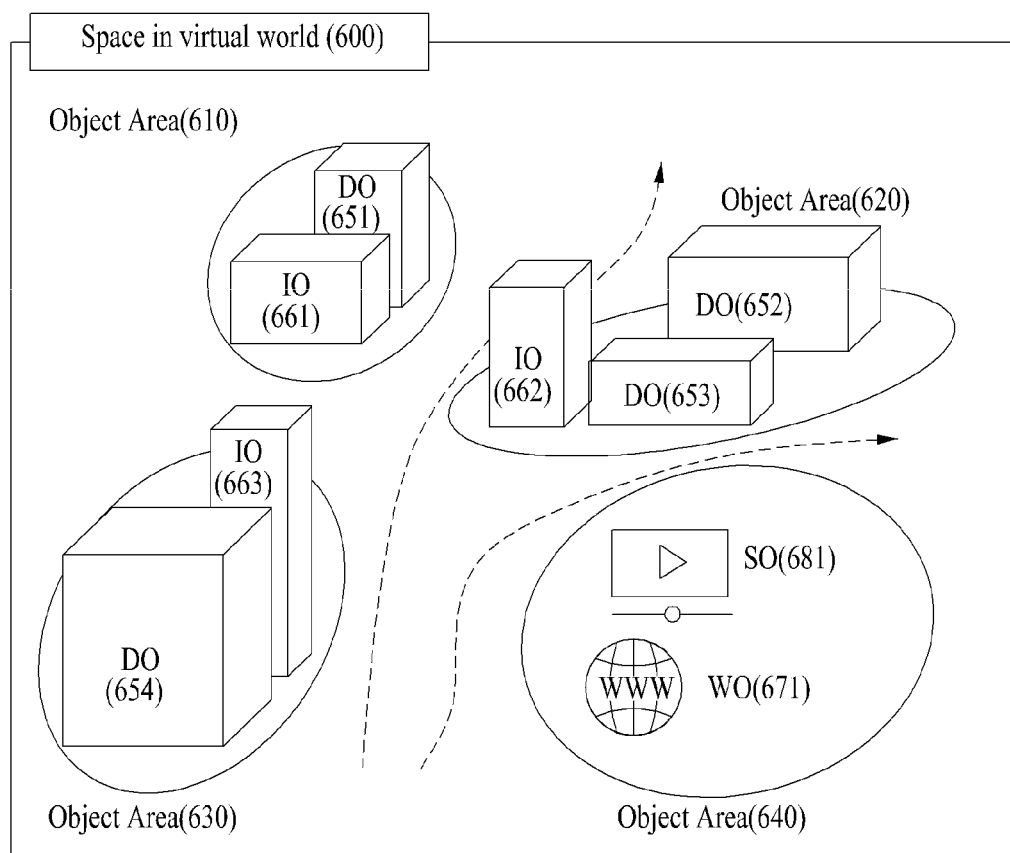
FIG. 6 is a diagram illustrating an example in which a digital object is configured in a space in a virtual world according to an embodiment of the present disclosure.

FIG. 5 is a diagram illustrating a relation between elements configuring a space in a virtual world according to an embodiment of the present disclosure. FIG. 6 is a diagram illustrating an example in which a digital object is configured in a space in a virtual world according to an embodiment of the present disclosure.

FIG. 5 illustrates that a space 500 in a virtual world, such as the VS 320, the MS 330 and/or the DTS 340 described with reference to FIG. 3, may include a digital object 510. In this case, the digital object 510 may be formed in an object area (OA), that is, an area including the space 500 in the virtual world. Furthermore, the digital object 510 may include a display object (DO) 511, an interaction object (IO) 512, a web object (WO) 513, and a streaming object (SO) 514. Each of the DO 511, the IO 512, the WO 513, and the SO 514 may optionally include a display area for the display of content.

FIG. 6 illustrates an example in which digital objects are deployed in OAs 610 to 640 formed in a space 600 in a virtual world. In this case, the digital objects may include DOs 651 to 654, that is, display objects, IOs 661 to 663, that is, interaction objects, a WO 671, that is, a web object, and/or a SO 681, that is, a streaming object. Each of dotted-line arrows 691 and 692 illustrated in FIG. 6 illustrates an example of a traffic line along which an agent may move.

As in the example of FIG. 6, according to an embodiment of the present disclosure, digital objects having various forms may be present in the space in the virtual world. Each of the digital objects may be generated based on an agent according to predetermined conditions. In this case, the digital object may be generated on the object area. If the space in the virtual world simulates the real world like a DTS (e.g., the DTS 340 in FIG. 3), the location of the object area may be determined based on a predetermined physical location of the real world. For example, if a specific shopping mall, a historic site, etc. in the real world is virtualized, the location of an object area may be determined to have the same configuration as an actual location.

The display object (DO) may be an object exposed to the space in the virtual world in a spatial form (or structural form), and may provide a simple control function to an agent. The interactive object (IO) may be exposed to the space in the virtual world in a spatial form, and may be an object having an interactive feature and capable of interacting with an agent. For example, the IO may provide various interaction features with an agent. Furthermore, the web object (WO) may be an object having a form in which content on the web is exposed through the space in the virtual world. Furthermore, the streaming object (SO) may be an object having a form in which streaming content, such as video or audio, can be continuously exposed.

The OA may have a spatial feature capable of generating a digital object, that is, a virtual object, in the space in the virtual world. The digital object present on the OA may basically have the following functions. Whether to provide each of the functions may be determined based on a contract between the owner of the digital object and the supplier of the space in the virtual world.

1. Agent Association-Related Function
   1) Interaction function: a function for providing an interface which can be directly controlled by an agent
   2) History function: a function capable of tracking and storing information related to the visit and interaction of an agent
   3) Interest information storage (favorite/like) function: a function capable of storing information of a digital object interested by an agent
   4) Follow me function: a function of making a digital object on the OA follow around an agent by making the digital object small windows or an icon
2. External API association-related function
   1) Function capable of sharing information on timing at which a digital object is generated and terminated in the space in the virtual world
   2) Interface function for providing, to the outside, agent-related information collected by digital objects on the OA
   3) Interface function for representing information on the DO or the IO by incorporating real world information (e.g., a function for representing information, such as order waiting in an actual store, congestion within a store, or a parking condition)
3. Gate association-related function
   1) Gate connection function: a function for connecting an agent to another VS or PS in a digital object present on the OA
4. Display area (DA)-related function
   1) DA function: this is an area where content may be exposed by the owner of a digital object depending on the owner's intention, and may be exposed to an agent.
   2) Display content request function: a function capable of receiving external content through a real world content control module A DO and an IO are some of elements that configure the space in the virtual world, and may be present on the object area (OA). The DO and the IO basically appear in a form in which they are displayed on a screen of a user, and may have characteristics of a structure having a given standard. External information of the DO may be provided from the owner of the DO to the supplier of the space in the virtual world or may be directly designed using a template provided by a supplier or a preset tool. Furthermore, each of the DO and the IO may have a display area (DA) which may be directly controlled by an owner. Content exposed in the DA may be provided based on a selection of the owner of the DO and/or the IO within a proper range based on a policy between the owner of the DO and/or the IO and the supplier of the space. The DA may individually have an exposure feature (e.g., perspective or a feature for highlighting regardless of perspective) based on a viewing angle of an agent and an interaction feature. Furthermore, each IO may have interactive features which may be directly controlled by the owner of the IO. The IO may provide an interaction suitable for a situation of an agent based on interaction feature activation information of the agent. For example, if a user wears only a head mounted display (HMD), the IO may provide an operation function having the same form as the DO. In contrast, if a user has a controller coupled to an HDM, the IP may provide an interaction feature (e.g., grabbing or pulling or drawing) with an agent, which is provided in a corresponding space in the virtual world. For another example, if a user has an additional motion recognition controller, a corresponding feature may be used for the IO. The DO may have basic control features. Such basic control features may include a basic control function of the space in the virtual world, which has been set by a supplier. For example, the basic control function may include history setting and/or interest information setting.

Figure 7:
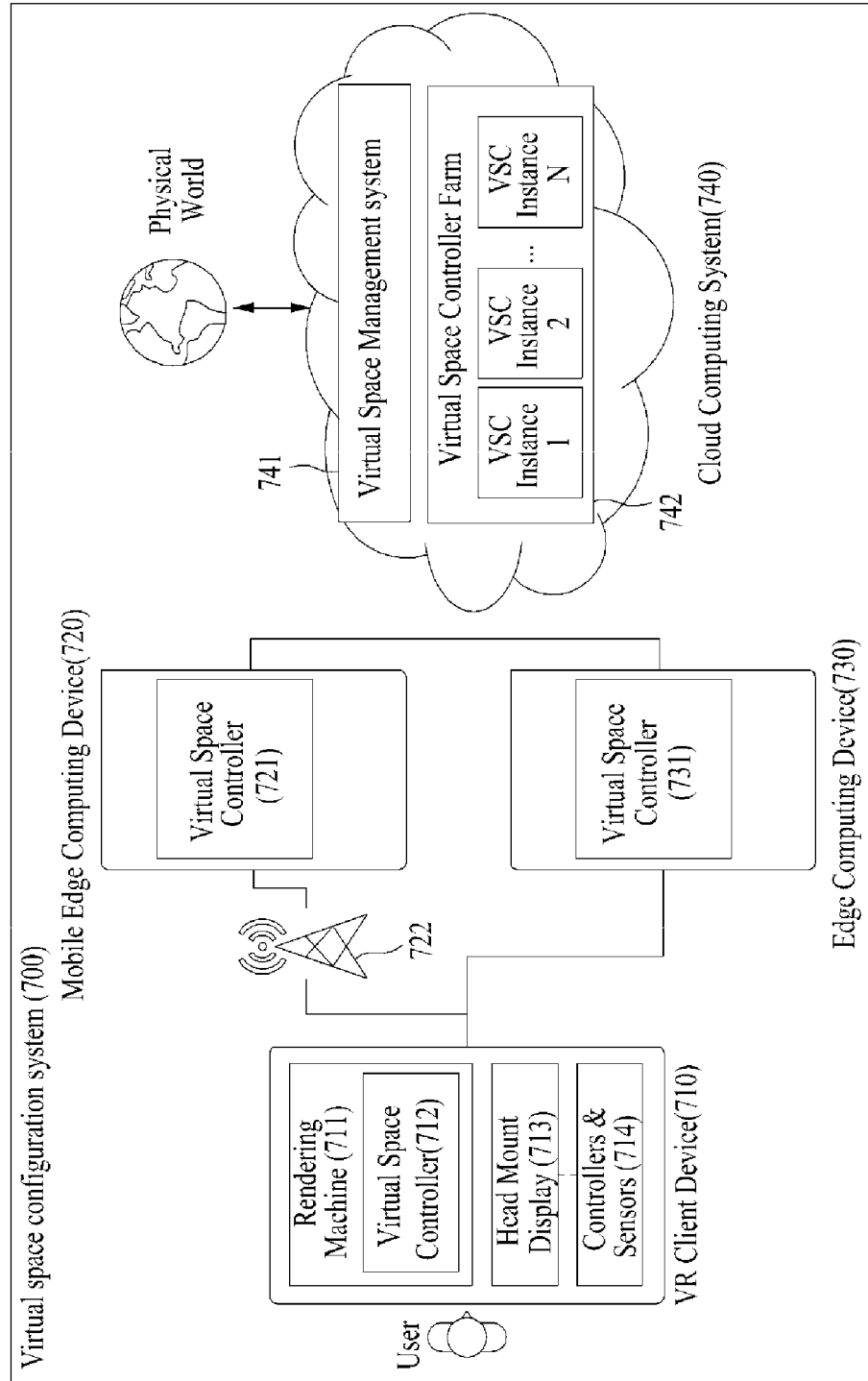
FIG. 7 is a diagram illustrating a schematic form of a virtual space configuration system according to an embodiment of the present disclosure.

FIG. 7 is a diagram illustrating a schematic form of a virtual space configuration system 700 according to an embodiment of the present disclosure. In FIG. 7, the virtual space configuration system 700 may include a virtual reality (VR) client device 710, a mobile edge computing device 720, an edge computing device 730, and a cloud computing system 740. Each of the VR client device 710, the mobile edge computing device 720, the edge computing device 730, and the cloud computing system 740 may be implemented through the computer device 200 described with reference to FIG. 2. It can be easily understood that the cloud computing system 740 may be implemented by two or more computer devices 200.

The VR client device 710 may be a physical device for displaying a space in a virtual world to a user. As illustrated in FIG. 7, the VR client device 710 may include a rendering machine 711. The rendering machine 711 may include a virtual space controller (VSC) 712, a head mount display (HMD) 713, and controllers & sensors 714. The rendering machine 711 may display a space in the virtual world on the HMD 713 through the VSC 712. An output value of the controllers & sensors 714 may be used to control the agent of a user in the space in the virtual world and/or to interact with digital objects deployed in the space in the virtual world.

In some embodiments, the VSC 712 may not be directly included in the VR client device 710 or the rendering machine 711, but may be included in the mobile edge computing device 720 or the edge computing device 730. For example, if the VR client device 710 of a user is a device capable of directly rendering a space in a virtual world, the space in the virtual world may be rendered using the VSC 712 of the VR client device 710. In contrast, if the VR client device 710 of a user cannot directly render a space in a virtual world, the VR client device 710 may render the space in the virtual world through the VSC 721 of the mobile edge computing device 720 wirelessly connected to the VR client device 710 through an access point 722 or through the VSC 731 of the edge computing device 730 connected to the VR client device 710 in a wired manner, and may display the rendered space on the HMD 713. If both the mobile edge computing device 720 and the edge computing device 730 are not supported, as will be described later, the space in the virtual world may be rendered using a VSC farm 742 included in the cloud computing system 740. The VSC farm 742 may generate an instance of a VSC for a user, and may support that the user displays a rendered space in a virtual world on the HMD 713. In this case, the VSCs 712, 721 and 731 may be VSC instances that are generated and provided through the VSC farm 742 by the cloud computing system 740.

The VSCs 712, 721 and 731 may render a space in a virtual world so that content delivered in relation to the display area of a digital object is displayed in the space in the virtual world for an agent. The cloud computing system 740 that configures a space in a virtual world and provides services may generate the VSCs 712, 721 and 731 for the VR client device 710 of a user corresponding to an agent. The VSCs 712, 721 and 731 may be launched into at least one of the VR client device 710, the mobile edge computing device 720, the edge computing device 730 or the cloud computing system 740, and may support the rendering of a space in a virtual world for the VR client device 710.

The VR client device 710 may be directly connected to the cloud computing system 740 or connected to the cloud computing system 740 through the mobile edge computing device 720 or the edge computing device 730, and may be supplied with services related to a space in a virtual world.

The cloud computing system 740 may be a system of a service provider for configuring a space in a virtual world and providing a user with services related to the space in the virtual world. As illustrated in FIG. 7, the cloud computing system 740 may include a virtual space management system 741 and a VSC farm 742. The VSC farm 742 may be implemented in a form included in the virtual space management system 741. The virtual space management system 741 is more specifically described with reference to FIG. 8.

Figure 8:
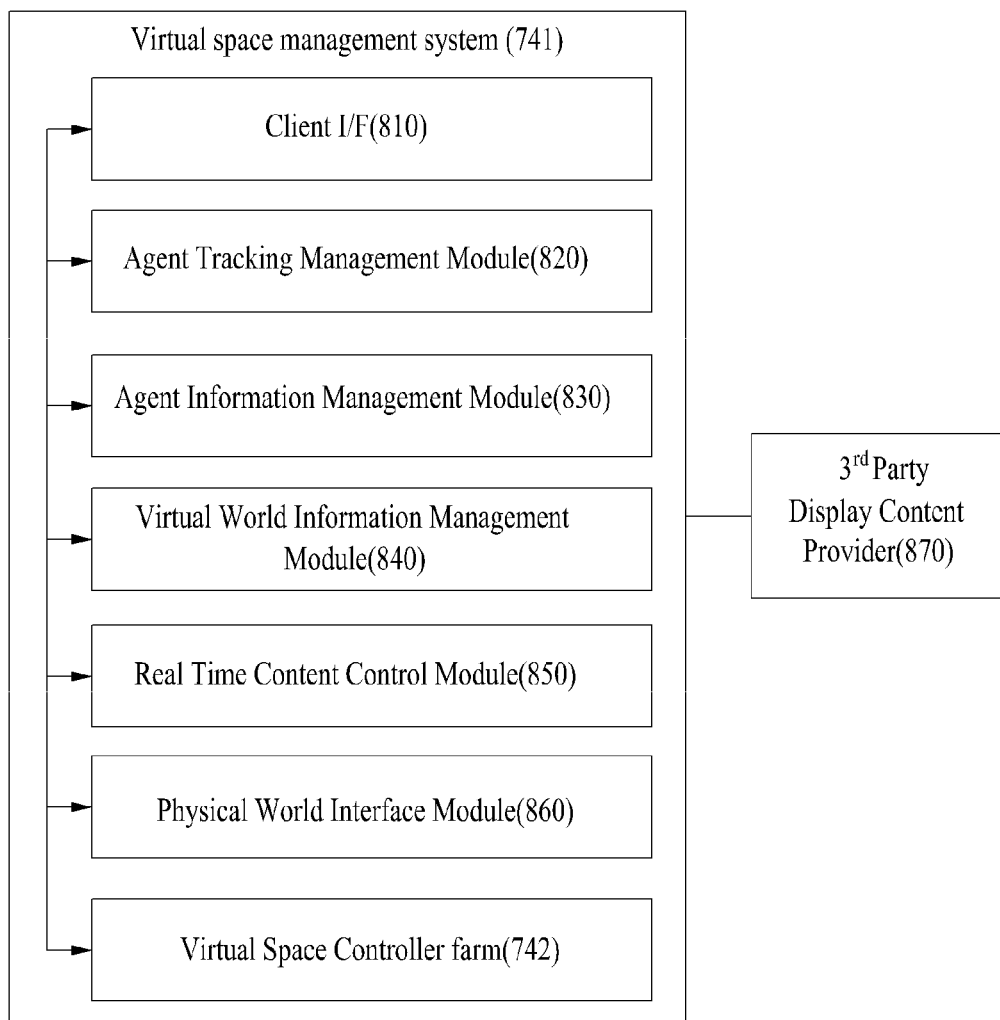
FIG. 8 is a block diagram illustrating an example of internal elements of a virtual space management system according to an embodiment of the present disclosure.

FIG. 8 is a block diagram illustrating an example of internal elements of the virtual space management system 741 according to an embodiment of the present disclosure.

As illustrated in FIG. 8, the virtual space management system 741 according to the present embodiment may include a client interface (UF) 810, an agent tracking management module 820, an agent information management module 830, a virtual world information management module 840, a real-time content control module 850, a physical world interface module 860, and a VSC farm 742. The elements of the virtual space management system 741 may be functional expressions of the processor 220 included in at least one computer device 200 that implements the cloud computing system 740.

The client I/F 810 may provide a user interface for the VR client device 710. For example, the client I/F 810 may provide various user interfaces through which a user can interact with a space in a virtual world in a process in which the user is provided with services for the space in the virtual world, which is provided by the cloud computing system 740, using the VR client device 710.

The agent tracking management module 820 may track an agent deployed and moved in a space in a virtual world. Information obtained as the agent is tracked may be stored in a tracking database (DB) in real time in associated with the identifier (ID) of the agent. Tracking history information for the agent may be stored in a tracking history DB in association with the ID of the agent.

The agent information management module 830 may store the profile of an agent and the consent of the agent. For example, the agent information management module 830 may store the profile of the agent in an agent profile DB in association with the ID of the agent, and may store the consent contents of the agent in an agent consent DB in association with the ID of the agent. In this case, the consent may include personal information and consent to privacy & terms.

The virtual world information management module 840 may manage information on a space in a virtual world. For example, the virtual world information management module 840 may store information on the policy of the space in the virtual world, virtual map information, information on the location of the space in the virtual world (e.g., GPS information for the space in the virtual world), information on digital objects deployed in the space in the virtual world, etc., and may provide corresponding information in response to a request from another module.

The real-time content control module 850 may select content to be displayed in a space in a virtual world. For example, the real-time content control module 850 may select content to be displayed in the display area of a digital object, which is configured within the space in the virtual world. To this end, the real-time content control module 850 may include a function for content bidding and a function for selecting content to be displayed. For example, the real-time content control module 850 may select content to be displayed in a display area based on the bidding of a third party display content provider 870.

The physical world interface module 860 may provide a function for controlling a physical resource and an interface for physical resources.

As described above, the VSC farm 742 may generate, provide and manage an instance of the VSC in order to help the rendering of the VR client device 710.

The virtual space management system 741 may receive HMD information and control/sensor information from the VR client device 710. The HMD information may include device motion tracking information of degrees of freedom (3-DoF) or 6-DoF. The device motion tracking information may include motion tracking information for the VR client device 710. Furthermore, the HMD information may include user information from the VR client device 710. For example, the user information may include the rotation of the head of a user, a motion of the body of the user, and eye-gaze information of the user. Furthermore, the HMD information may include rendering-related information, such as rendering delay or temperature. Control/sensor information may include information on a motion of the body of a user or real-time controller information, such as a key event or a movement.

A detailed embodiment of a method and system for providing web content in a VR environment is described below.

In the VR environment, users consume contents on the web individually or several users consume content on the web simultaneously. In this case, there is a need for a method for using the content in the form of an individual object not a concept of a window. In particular, in the VR and metaverse environment, it is necessary to improve a content search experience using a hyperlink upon browsing.

The web object (WO) 513 or 671 may be an object having a form in which content on the web is exposed through a space in a virtual world. The WO is an object which may be classified based on the existing web content, and may be configured with text, an image, and playable content (e.g., video or audio). When an agent, an avatar, a digital object, AI, etc. speaks a natural language for the purpose of communication, the web object may further include a voice.

A tag breakpoint for an individual object unit may be used for classification criteria for the WO. An individual object may be classified based on a style, such as <div>, or a HTML tag, such as <img>, <video>, <table> or <canvas>. Furthermore, in addition to the use of the <audio> tag, in order to classify a voice as an individual object, a separate sound-related tag may be newly defined. A background sound, a space sound such as a buzzing sound at a specific point, etc. in addition to a voice according to the speaking of a natural language may be classified as a sound-related tag.

A tag corresponding to an individual object has a tangible characteristic, and may use a basic interface (e.g., object area) provided in VR services or a third party tangible characteristic intended by a content producer. A control interface or an interface based on an output or playback may be provided depending on characteristics of each object for each object. Furthermore, if content or a message is dynamically generated based on software through AI, etc. in a service, in order to process the content or the message, output in a type form in addition to the original output form may be supported. For example, there is provided a function for enabling a user to request a corresponding message in a message form, such as text not a sound, without missing the message when a virtual agent bot outputs a voice.

Figure 9:
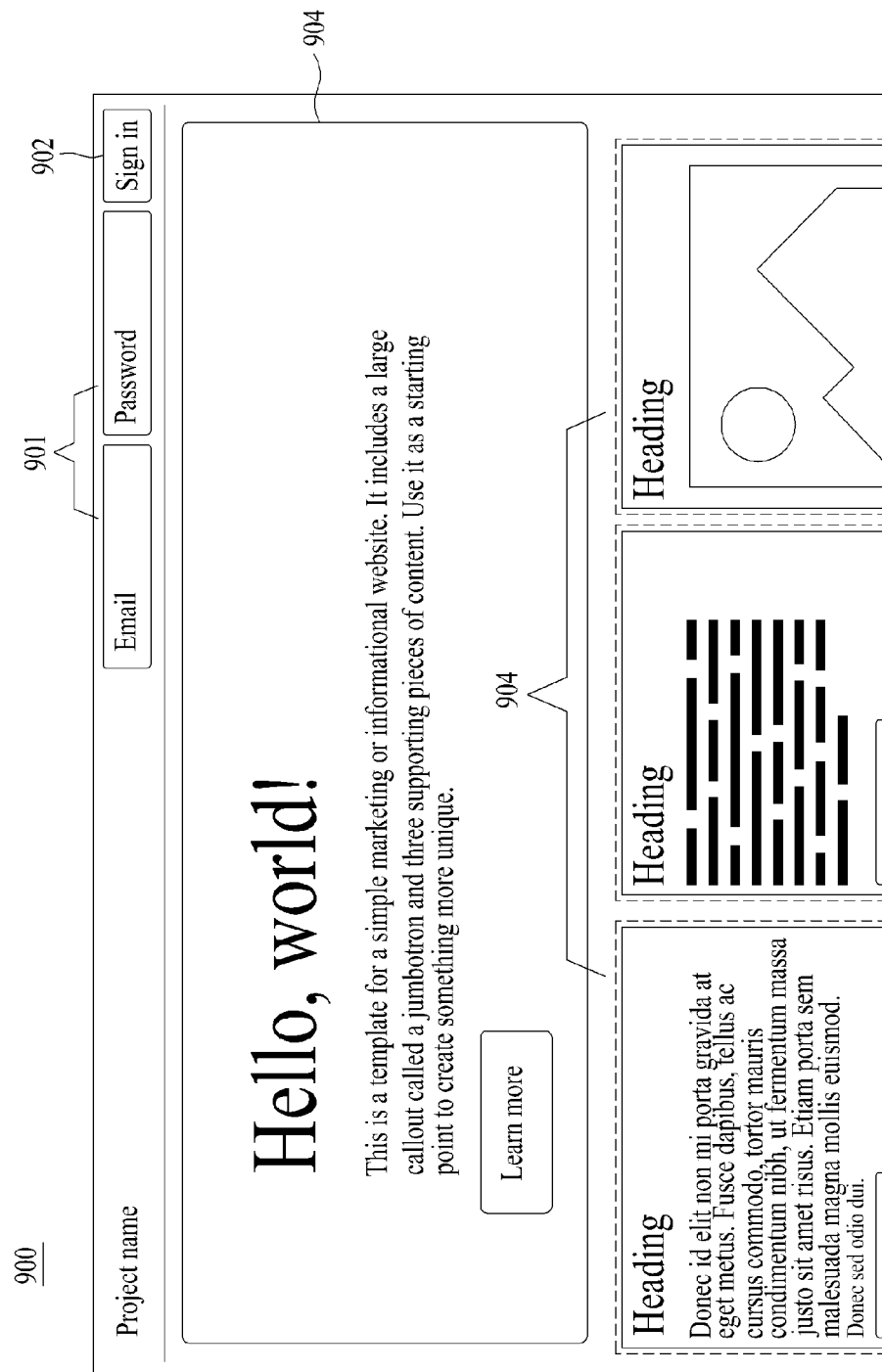
FIG. 9 illustrates an example of web content according to an embodiment of the present disclosure.

FIG. 9 illustrates an example of web content 900, such as content written as a HTML tag.

The web content 900 may be classified as an individual object using a <div> tag so that cascading style sheets (CSSs) can be easily applied. As illustrated in FIG. 9, the web content 900 may include a user input object 901, an input button object 902, and a hyperlink 903 classified based on a criterion <tag>, and may include a content object 904 classified based on a criterion <div id> or <class>.

Figure 10:
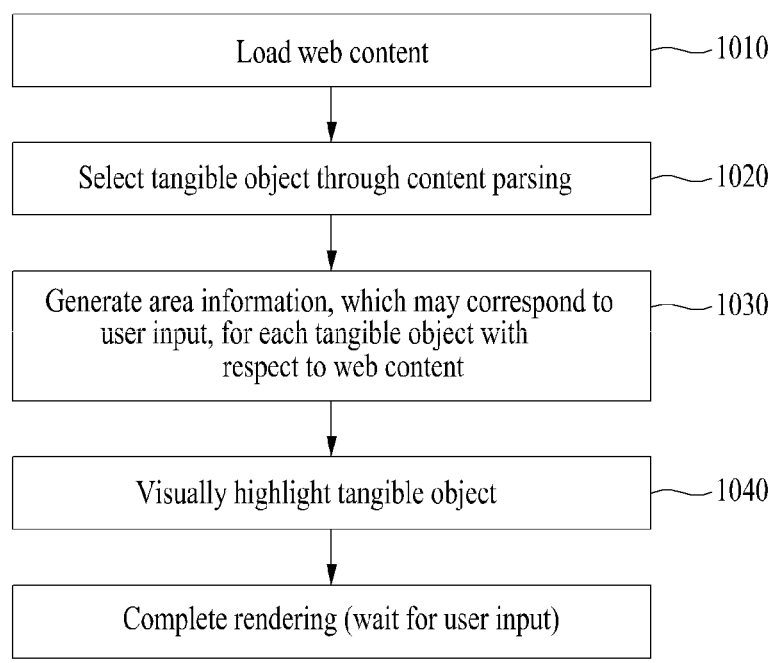
FIG. 10 is a flowchart illustrating an example of a process of recognizing a tangible object for web content according to an embodiment of the present disclosure.

FIG. 10 is a flowchart illustrating an example of a process of recognizing a tangible object for web content according to an embodiment of the present disclosure. The process of recognizing a tangible object according to the present embodiment may be performed by the computer device 200 that implements a device capable of rendering a space in a virtual world (corresponding to the VR client device 710, the mobile edge computing device 720 or the edge computing device 730 described with reference to FIG. 7).

At step 1010, the computer device 200 loads, from a publisher (e.g., the servers 150 and 160), web content to be exposed through a VR space.

At step 1020, the computer device 200 selects an object having a tangible characteristic, that is, a tangible object, by parsing the web content loaded at step 1010.

Figure 11:
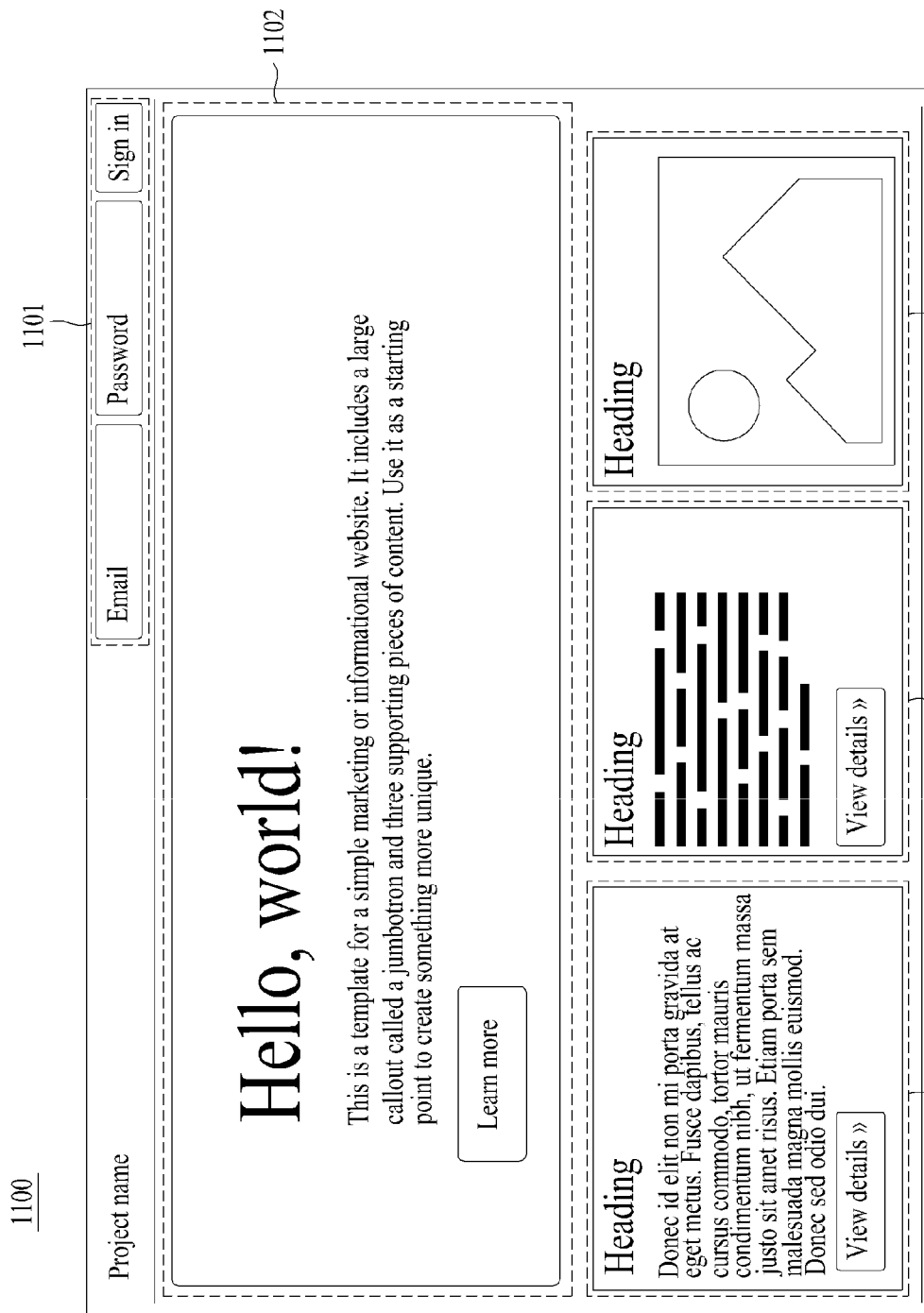
FIG. 11 illustrates an example of a tangible object for web content according to an embodiment of the present disclosure.

Referring to FIG. 11, the computer device 200 may select an individual object to be recognized as a tangible object 1101 to 1105 based on a <div> tag by parsing web content 1100. If <tag> for a user input, such as the user input object 901 or the input button object 902, is contiguously present within a neighbor area, the contiguous objects may be grouped into a single tangible object 1101 using the <div> tag, that is, a higher classification criterion.

At step 1030, the computer device 200 generates area information, which may correspond to a user input, for each tangible object selected at step 1020 with respect to the web content loaded at step 1010. In other words, the computer device 200 separately generates area information for the user input to the tangible object, that is, area information corresponding to each tangible object included in the web content.

At step 1040, the computer device 200 may apply visual highlighting to the tangible object in exposing the web content loaded at step 1010 through a VR space. The computer device 200 may highlight an area, generated for each tangible object, as an individual object area.

The computer device 200 may recognize the tangible object within the web content in a process of rendering the web content in the VR space, and may display an area for the user input, generated for each tangible object, by visually highlighting the tangible object.

Figure 12:
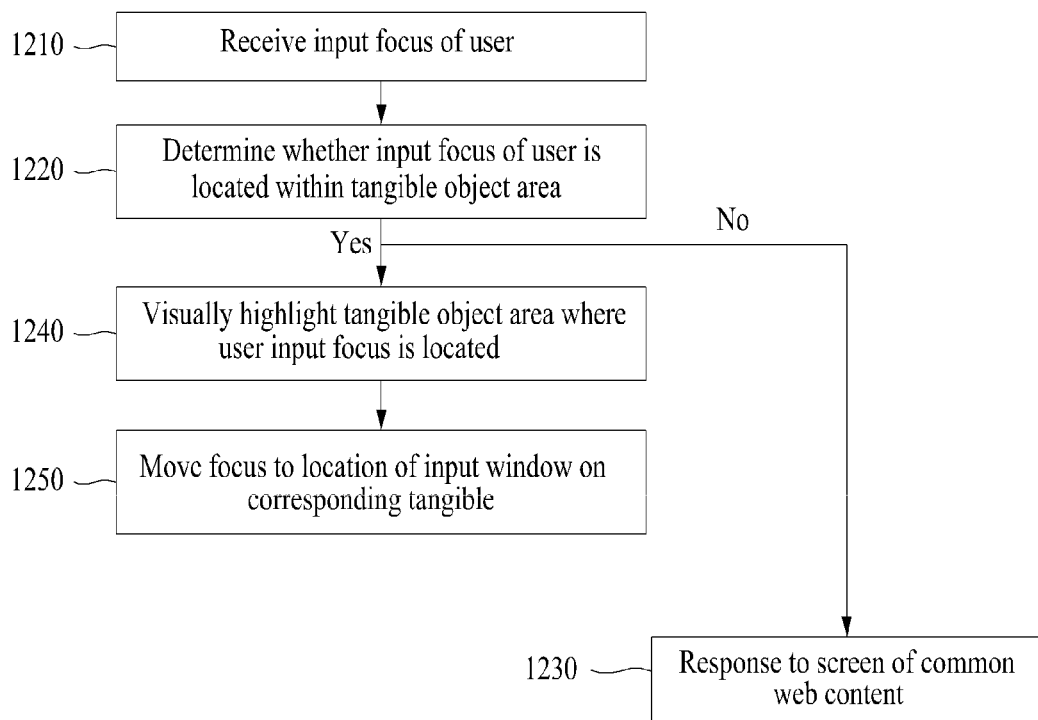
FIG. 12 is a flowchart illustrating an example a focusing movement process on a tangible object according to an embodiment of the present disclosure.

FIG. 12 is a flowchart illustrating an example a focusing movement process on a tangible object according to an embodiment of the present disclosure. The focusing movement process according to the present embodiment may be performed by the computer device 200 that implements a device capable of rendering a space in a virtual world (corresponding to the VR client device 710, the mobile edge computing device 720 or the edge computing device 730 described with reference to FIG. 7).

The computer device 200 may provide a user input environment for web content rendered in a VR space. If an element through which a user's input can be received, such as an input, text, or a select tag, is present in a tangible object, a focusing motion technology on the tangible object is necessary.

At step 1210, the computer device 200 receives an input focus through the input means of a user with respect to web content rendered in the VR space. The computer device 200 may recognize a location of the web content, which is focused by the user, as the input focus of the user.

At step 1220, the computer device 200 determines whether the input focus of the user is located within a tangible object area of the web content. The computer device 200 may recognize on which tangible object the user focuses within the web content rendered in the VR space.

At step 1230, if the input focus of the user deviates from the tangible object area, the computer device 200 may process the corresponding input focus as a response to a screen of common web content.

At step 1240, if the input focus of the user is located within the tangible object area, the computer device 200 may visually highlight the tangible object area where the corresponding input focus is located so that the tangible object area is different from another tangible object.

At step 1250, the computer device 200 may move a focus to a location where the input window of a corresponding tangible object is located through auto-focusing as the input of the user for the input focus is moved within the tangible object area where the input focus of the user is located.

The computer device 200 may support an auto-focusing and auto-complete function in addition to a focusing movement on a tangible object.

When focusing is performed on a tangible object, the focusing may be performed in a form, such as a gesture, eye tracking or auto-focusing. The computer device 200 may parse focused data and transmit the data to an agent that manages user information in a virtual environment. In this case, the computer device 200 may perform an automatic input on basic information set by a user or user information, collected through a behavior of the user in a platform, based on natural language processing (NLP).

A portion that belongs to a tangible object and that is related to a user input may be eventually replaced with an AI-based data using a user agent provided in a virtual environment. Accordingly, if a user agent of the VS 320 determines a tangible object or an input form and finds a corresponding target in an environment (e.g., a space, focusing, a service flow or context) adjacent to the user agent, the user agent may request the generation of input information. If "auto complete" among the existing W3C form-related elements is on, a corresponding function may operate. In this case, a user agent, that is, a browser-based agent or a user agent provided in a VR environment (metaverse) platform may process a function for an automatic input as a background process and then provide notification to a user in a UI way. Thereafter, the user agent may deliver input information to a server side based on user consent.

Figure 13:
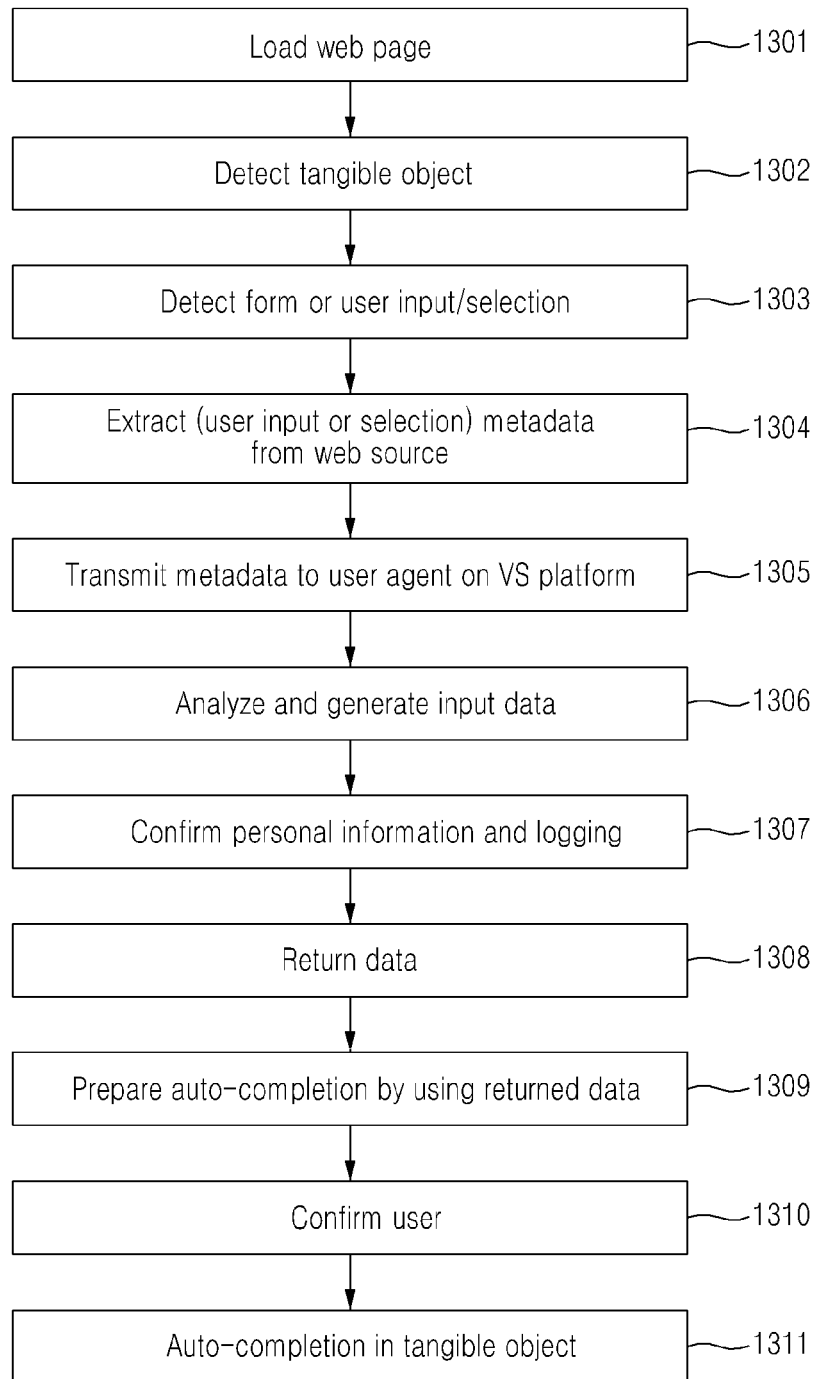
FIG. 13 is a flowchart illustrating an example of an auto-focusing and auto-complete process in an embodiment of the present disclosure.

FIG. 13 is a flowchart illustrating an example of an auto-focusing and auto-complete process in an embodiment of the present disclosure.

Referring to FIG. 13, in step 1301, the computer device 200 loads a web page to be exposed through a VR space.

In step 1302, the computer device 200 detects a tangible object in the loaded web page.

In step 1303, the computer device 200 may detect a form related to an input, a user input/selection, etc. in the tangible object. In other words, the computer device 200 may determine whether an input focus of a user is in a tangible object area or a tag whose auto-completion is on. In the case of a service provider contracted with a VS platform, a function for automatically supporting auto-completion of a user agent may be on based on a domain or a certificate of a web site.

In step 1304, the computer device 200 may extract metadata from a web source according to a user input. The computer device 200 may extract required data based on form-related label information or additionally defined metadata.

In step 1305, the computer device 200 may transmit, to a user agent on a VS platform, the metadata extracted in step 1304. An agent that generates a tangible object may deliver metadata to a VS platform agent of a corresponding user based on permission previously agreed with the user. In this case, since information (e.g., an ID or an identifiable delimiter) on the VS of the user is also transmitted, a response value automatically generated based on ID-based information exposure setting may be different. The information may be associated according to a mutual contract based on a characteristic of VS information, a service provider, etc. In order to prevent an attack such as DDoS, the number of service requests may be limited in a unit, such as a domain or a page.

In step 1306, the computer device 200 may analyze and generate input data based on an input form or user input/selection.

In step 1307, the computer device 200 may perform logging after checking the privacy of the input data.

In step 1308, the computer device 200 may return data on which the privacy check and logging have been performed.

In step 1309, the computer device 200 may prepare an auto-complete function by using the returned data.

In steps 1310 and 1311, the computer device 200 may perform auto-completion within the tangible object after confirming the user. The computer device 200 may explicitly generate a user confirmation step with respect to the user privacy-related contents or optional information (e.g., information that must be confirmed by a user, such as payment or an order) among automatically inputted information, and may expose the user confirmation step to a VS environment.

Figure 14:
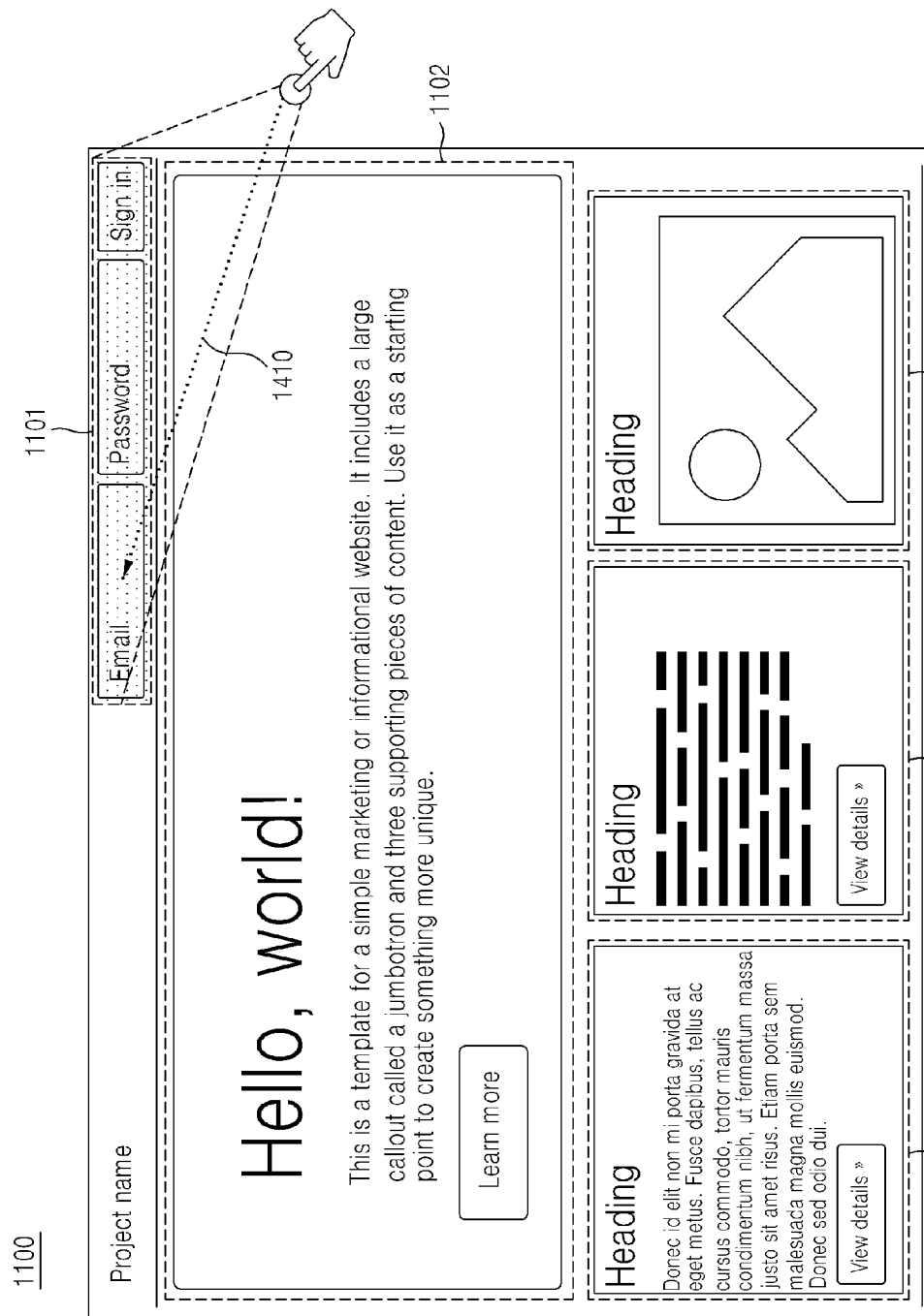
FIGS. 14 to 16 illustrate examples of auto-focusing based on a movement of the input focus of a user according to an embodiment of the present disclosure.

Referring to FIG. 14, if an input focus 1410 of a user for web content 1100 rendered in a VR space is located on any one tangible object 1101, the computer device 200 may highlight the area of the tangible object 1101 so that the tangible object 1101 is distinguished from other tangible objects 1102 to 1105.

Figure 15:
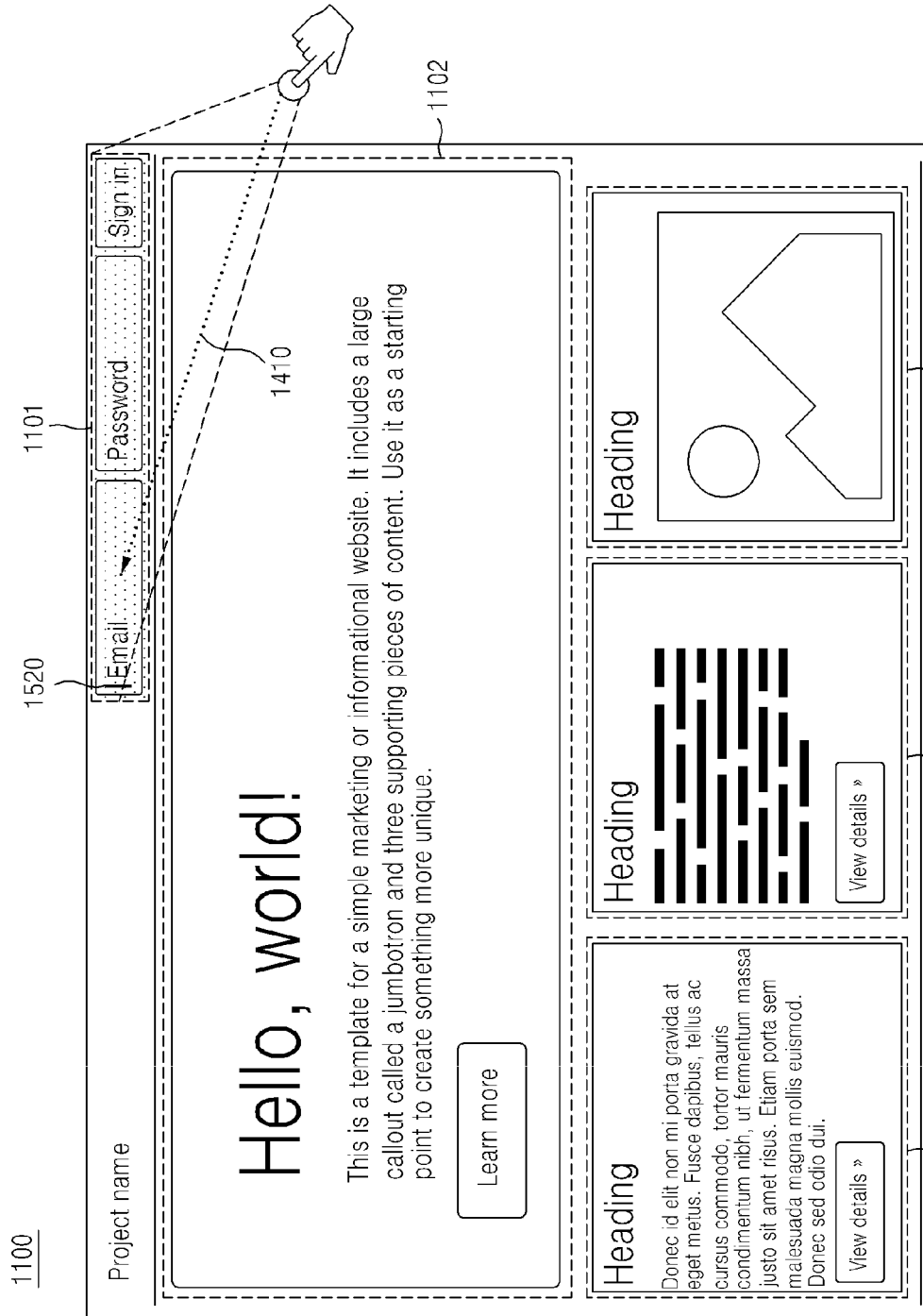
Figure 16:
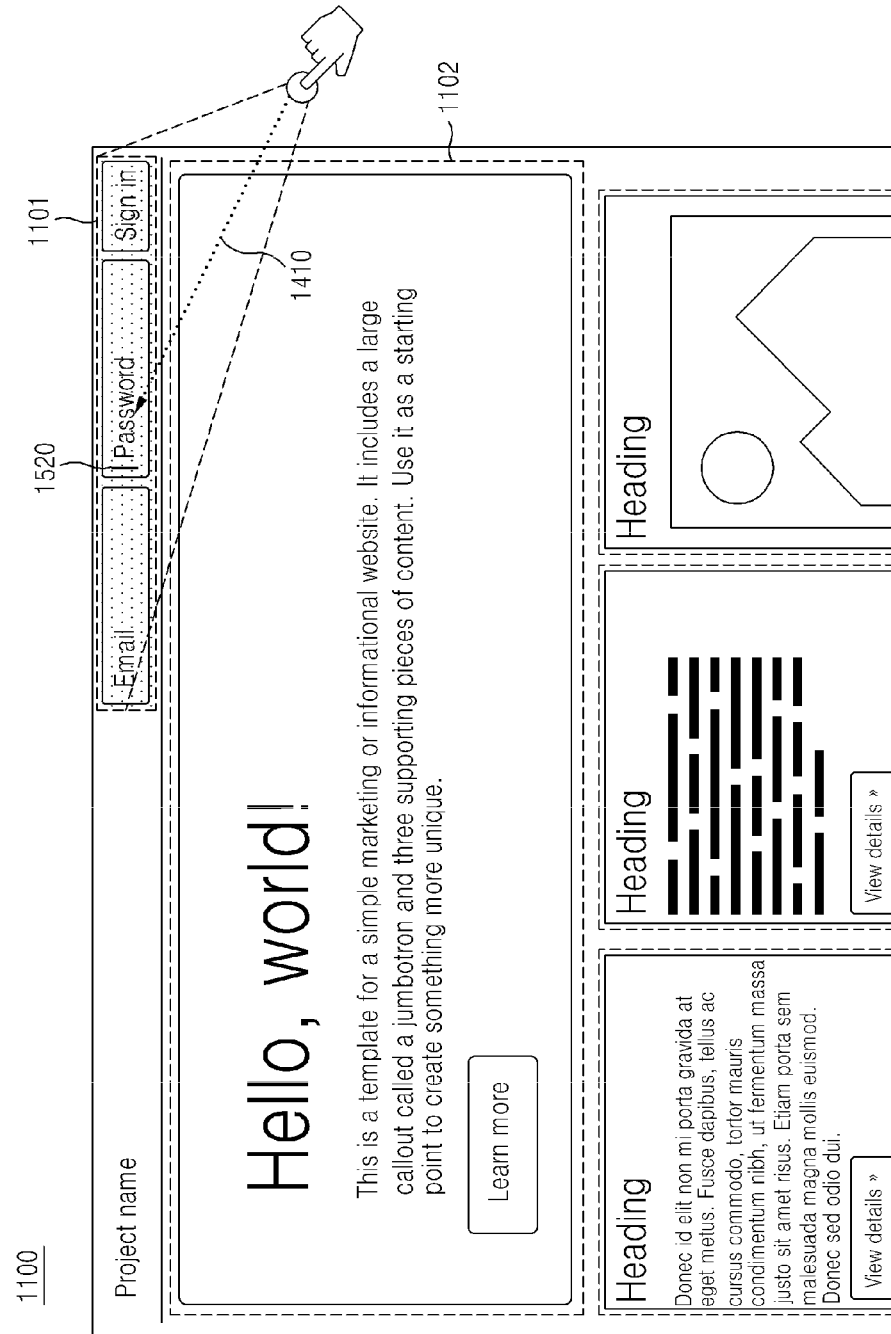

As illustrated in FIGS. 15 and 16, the computer device 200 may move a focus 1520, such as a cursor, to a location corresponding to the input focus 1410 of a user within an input window of a tangible object 1101 through an auto-focusing method in response to a movement of the input focus 1410 of the user.

If plural elements through which a user input, such as an input, text, or a select tag, can be received are present within a tangible object area, auto-focusing may be performed based on an individual object sequence on a code and an individual object location on cascading style sheets (CSS).

In order to determine the sequence of the auto-focusing for the input focus of a user at timing at which content is produced, a separate metadata tag may be used. The metadata tag may designate the priority of an input in an integer value form or describe the priority of the input as relative information, with respect to a tag capable of a user input for each <div> tag or <class> tag.

Furthermore, if a user's input is necessary on a tangible object, an additional function for a user input method may be provided because a user input method, such as using a keyboard, is inconvenient in a VR environment.

The computer device 200 may use a system provision method, such as a virtual keyboard, as a basic input method. The computer device 200 may use a voice input method or a brainwave input method in addition to the virtual keyboard. In some embodiments, if the computer device 200 operates in conjunction with a third party device, an input method using a third party input tool may also be used.

If content provided through a VR environment is segmented, that is, objectified, in a user client stage environment, a publisher who provides web content may be deprived of the opportunity to expose a desired publication format or additional content (e.g., advertising).

Accordingly, the publisher may provide a method for selectively rejecting content from being objectified or sequentially exposing related content. The publisher may previously present whether to support segmentation by providing information on a content exposure method on HTML, such as <vr rendering-option="segment">, <vr rendering-option="no_segment">.

Furthermore, the publisher may also plan and provide, in an object unit, requirements for a publication format, a content exposure method, and additional content for content which may be objectified.

Figure 17:
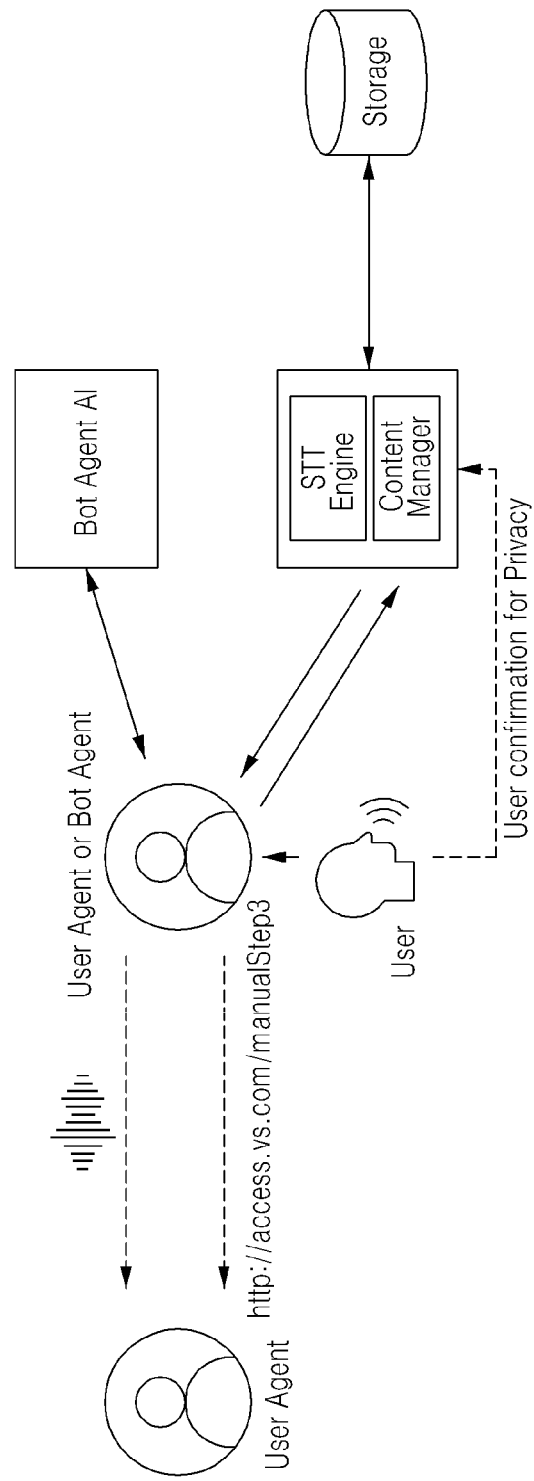
FIG. 17 illustrates an example of a process of agents performing communication therebetween in a web-based VR environment in an embodiment of the present disclosure.

FIG. 17 illustrates an example of a process of agents performing communication therebetween in a web-based VR environment in an embodiment of the present disclosure.

Referring to FIG. 17, the computer device 200 may support communication between agents (between users or between a user and a virtual bot) on the VR-based VS.

A user may be provided with corresponding content in a form requested by the user, for example, in a text or web object form not a voice by requesting the corresponding content, with respect to specific contents while listening to contents spoken by a counterpart agent. When text or a script of the content is provided in a manual form, the counterpart agent may deliver the content to the user through voice speaking or the user may request the content in a form, such as a web page. If a common user speaks to another user on the VS through an agent, spoken contents may be delivered in a text message form through an STT engine, etc.

In this case, the contents spoken by a bot agent may be provided as the processing results of an NLP-based natural language or may be provided in a pre-assigned text form, such as a web page or manual data. Furthermore, the contents spoken by the user agent may be delivered in a voice form.

In other words, an agent participating in VS may provide its own output results by converting the output results into a format having a form desired by a counterpart agent.

The computer device 200 may perform web rendering on a web page based on an object requested by the user, not window-based browsing in a VR environment. The user may easily select a desired web object. The following three functions are supported with respect to a selected area: a function for placing the selected area in a VR space, a function for obtaining a separate URL of the selection area, and a function for delivering only the selection area to another user.

Referring to FIG. 11, when a user selects an interested area in the tangible objects 1101 to 1105 of the web content 1100 exposed in the VR space, the computer device 200 may apply a method of generating a unique access URL so that the interested area can be used through the separation of the interested area of the user.

The computer device 200 may display an object, corresponding to the interested area of the user in the tangible objects 1101 to 1105 of the web content 1100, as a new window having a unique address by separating the object from the web content 1100.

In order to improve a web-based content search environment, a content search experience using a hyperlink upon existing browsing needs to be improved.

Web browsing in a common screen environment is tap browsing using a form in which a tap is added or a form browsed as a new window. It is difficult to check search contents because previous search contents are covered and to track a search history upon search in multiple states.

Furthermore, in the case of information rendered into a web page, the entire page information provided by a supplier is rendered. Accordingly, in the case of a portion actually interested by a user, for example, an area including long content, it is difficult to describe (or remember) which point has been selected in the portion and to which page a page has been changed.

The computer device 200 can improve a web-based content search experience by arranging a connection relation of a hyperlink and a browser based on the space. The computer device 200 may provide an arrangement function for maximizing an experience of a type in a wide space compared to a common window environment.

Figure 18:
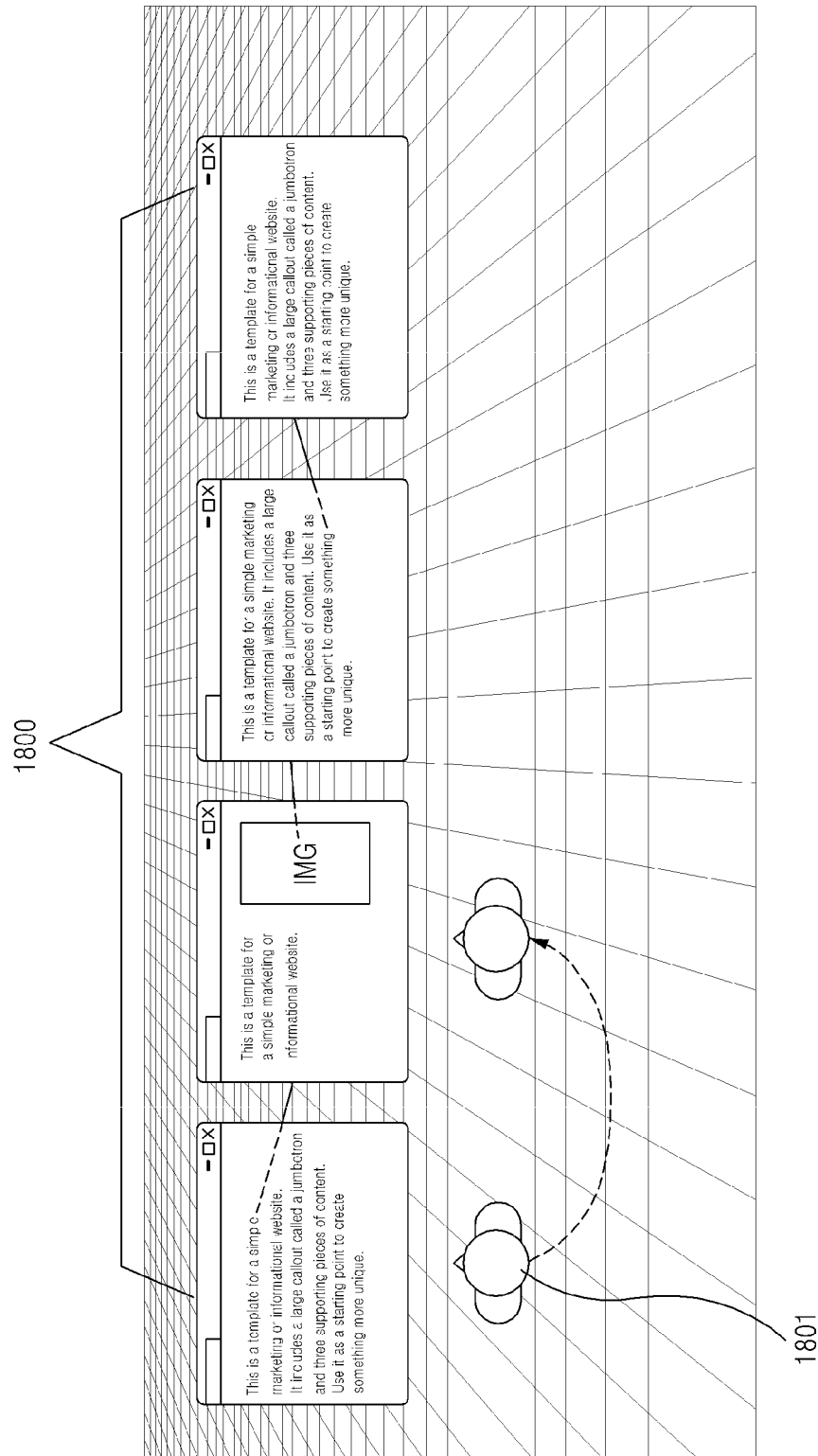
FIGS. 18 to 22 are exemplary diagrams for describing a web-based content search experience in an embodiment of the present disclosure.

Referring to FIG. 18, the computer device 200 may arrange web content 1800 in a VR space by browsing the web content 1800 as a new window. In this case, when the new window is generated, a location of an agent 1801 may be automatically moved ahead of the web content 1800 browsed as the new window depending on user setting.

In particular, the computer device 200 may provide an environment in which a search history of a user can be visualized and rapidly tracked. The search history may be tracked at timing desired by the user by supporting a spread-view function for the web content 1800 retrieved by the user. The spread-view method may be provided using a method of horizontally or vertically arranging the web content 1800 retrieved by the user based on user timing in a row or in a form in which the web content 1800 is arranged in a way to surround surroundings based on a location of the user agent 1801.

Timing at which the web content 1800 exposed in the VR space is watched needs to be moved. A browsing window of the web content 1800 may be moved in addition to a movement of the user agent 1801.

Figure 19:
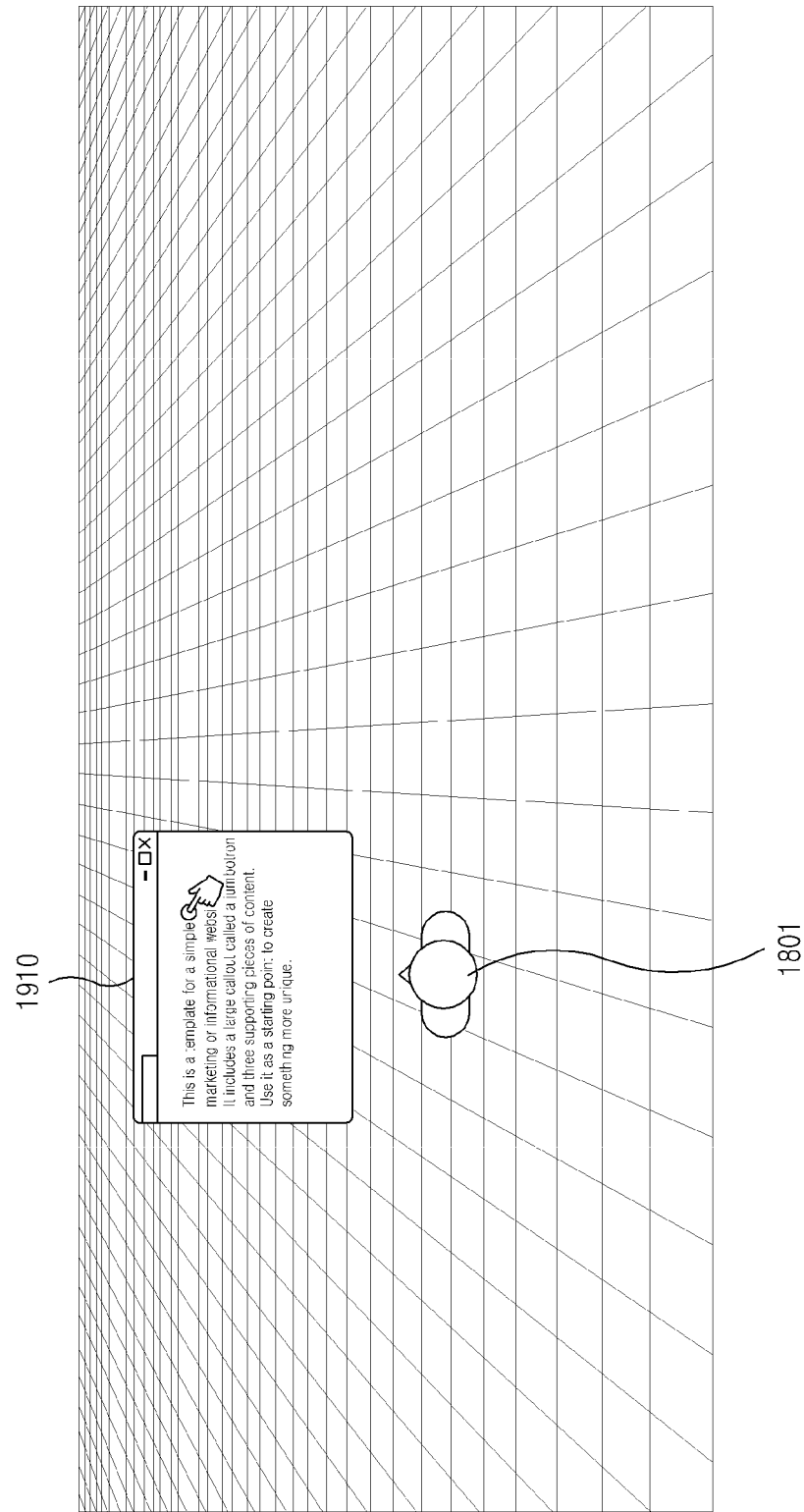
Figure 20:
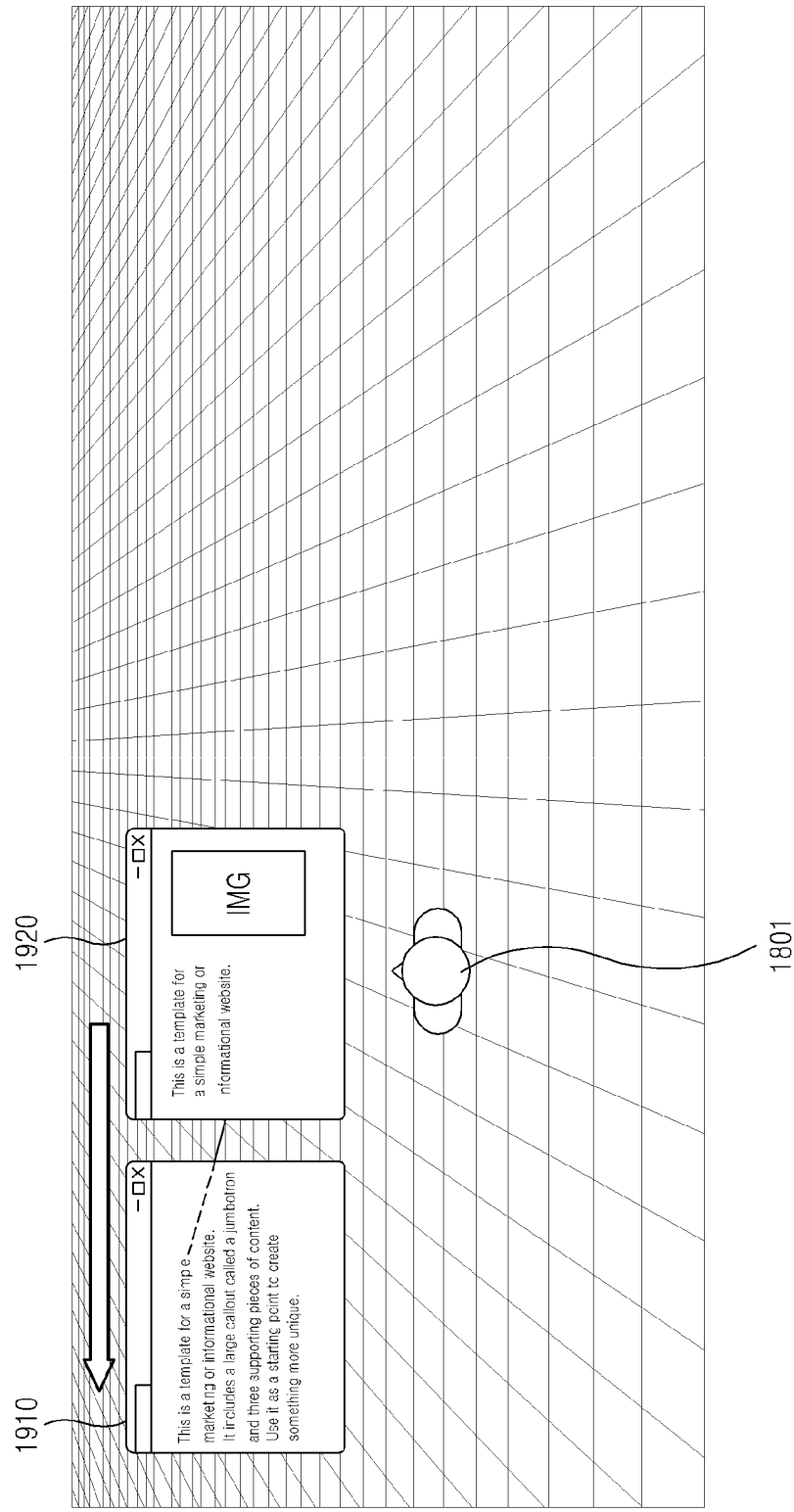

Referring to FIGS. 19 and 20, when a user clicks on a specific hyperlink in a browsing window 1910 in the VR space, the existing browsing window 1910 may be moved to the side in a form, such as animation, in the state in which a location of the user agent 1801 has been fixed. A new browsing window 1920 for the hyperlink clicked on by the user may be exposed ahead of the user agent 1801.

Furthermore, the computer device 200 may selectively select only a content area interested by a user not full content, and may arrange and expose the content area in the VR space in a form, such as a note. In this case, the computer device 200 may store at least some of a search path of the user with respect to the web content 1800 based on the selection of the user on VR.

Figure 21:
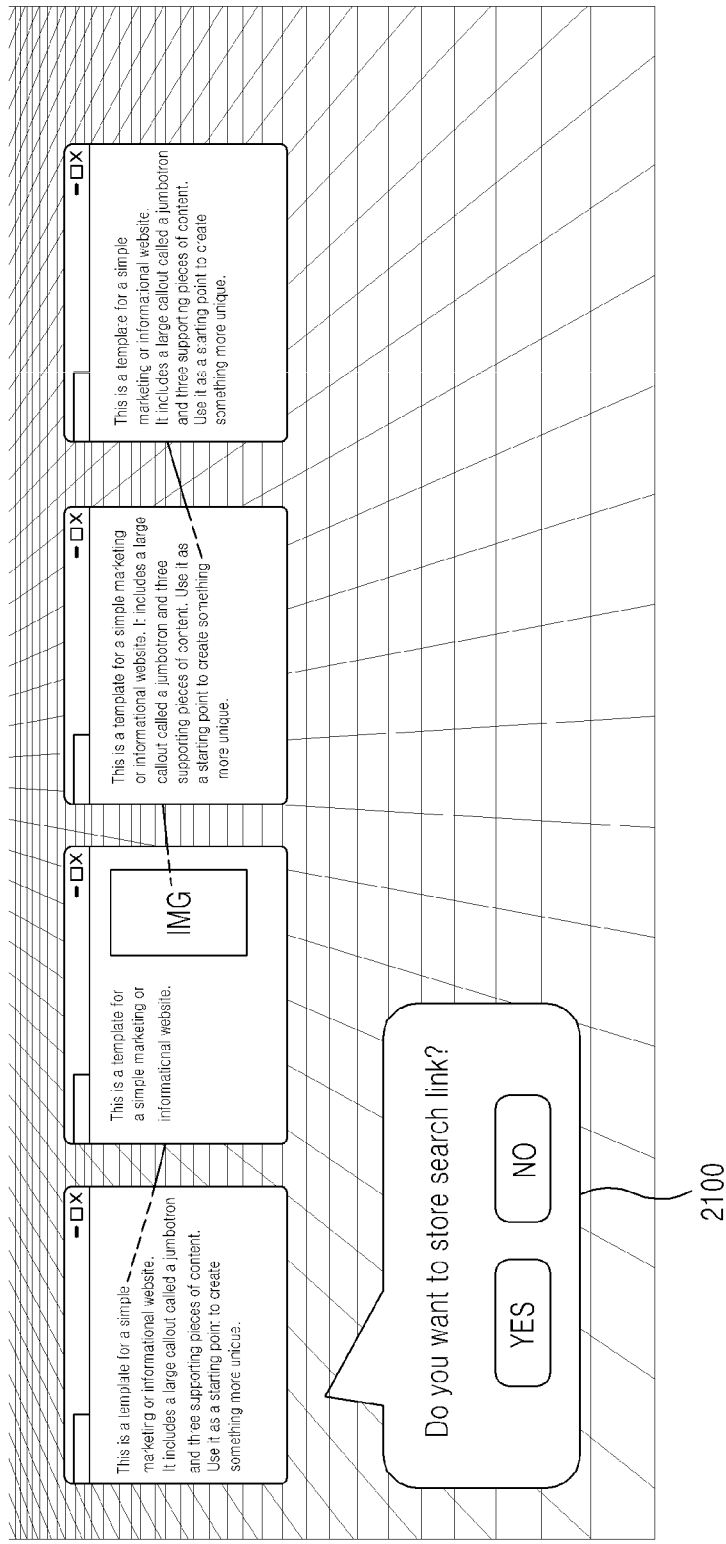

Referring to FIG. 21, the computer device 200 may store information corresponding to a search path through a question 2100 indicating whether a search path of a user will be stored. The search path may be stored using a storage related to VS, etc. In this case, a cost according to the storage may occur.

The computer device 200 may edit a search link relation included in a search path of a user by inputting a user motion, etc. with respect to the search path, and may then store only information corresponding to a specific search path.

Figure 22:
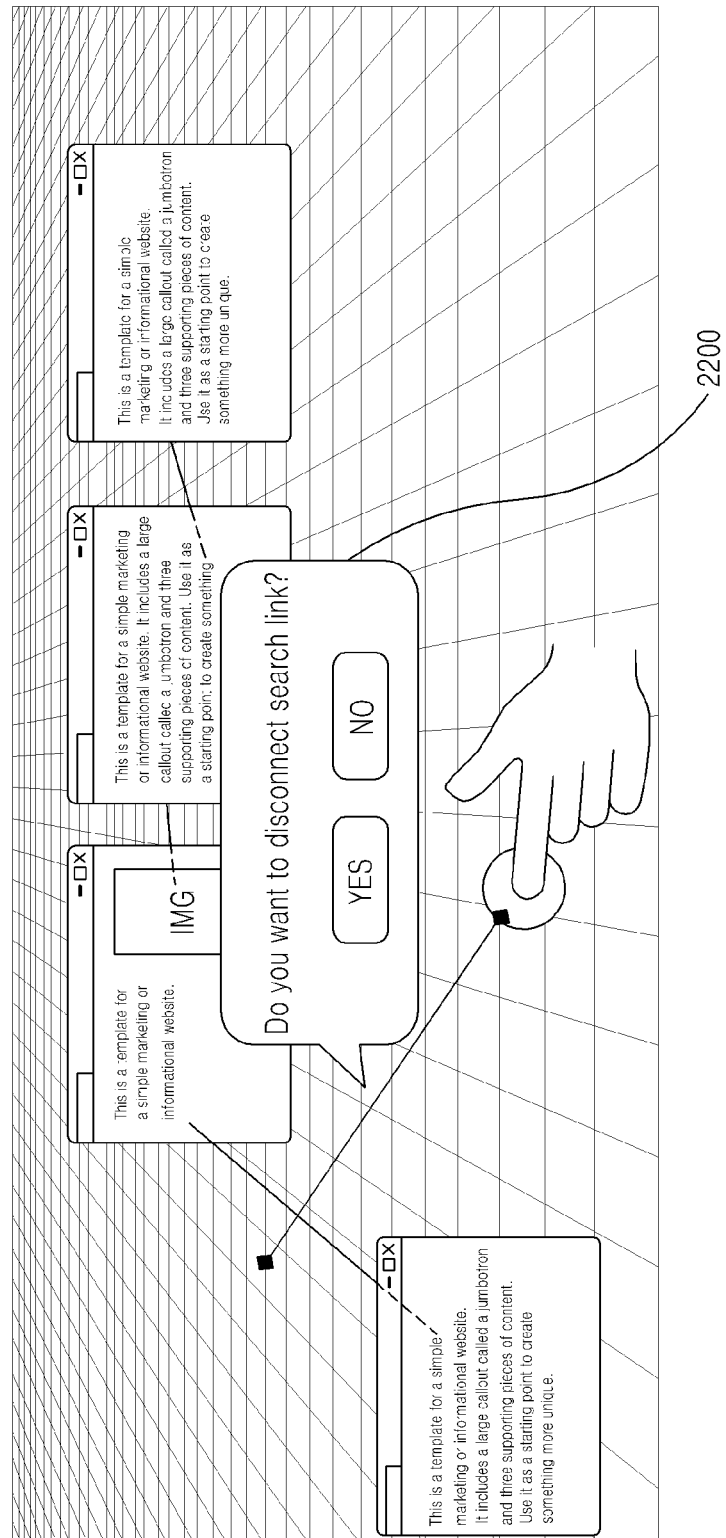

For example, if a user inputs a gesture to cut some relation in a search path as in FIG. 22, a search link connection may be disconnected through a user confirmation question 2200. In this case, if some connection relation of the search link is cut, a window closing function may also be performed on a selected path among a previous search path and a subsequent search path on the basis of a cut point.

According to the present embodiments, unlike in the existing application, in the VR and metaverse environment, the generation of a new window, a page change, etc. occurring as a user event for a function capable of tracking a user search record can be recognized and generated as an individual window mode.

In the case of a browser, the detection of the occurrence of a user event and an event change into a new window like a hyperlink on a DOM event can be provided. If a tracking function is provided in another application, a function for browsing as a new window so that a tracking function can be performed on a search path of a user based on separate setting can be provided. Furthermore, if retrieved IDs for a series of windows are separately tracked and window closing is requested at a middle point according to user selection, a function for closing a window prior to or posterior to the corresponding point can be provided.

As described above, according to embodiments of the present disclosure, content on the web in a virtual reality environment can be provided in an individual object form not a concept of a window.

The aforementioned apparatus may be implemented in the form of a hardware component, a software component or a combination of a hardware component and a software component. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method performed by a computer device, comprising:
rendering, by at least one processor included in the computer device, in a virtual reality (VR) space, a web page including a tangible object,
wherein rendering the web page comprises:
displaying, on a first browsing window displaying the web page, an area for a user input as an area corresponding to a corresponding tangible object with respect to tangible objects; and
displaying, on at least one second browsing window as another browsing window in the VR space, an interested object according to the user input among the tangible objects by separating the interested object from the web page,
wherein the rendering comprises
disposing the first browsing window displaying the web page and the second browsing window displaying the interested object in individual browsing windows in the VR space, respectively;
tracking and visualizing a search link relation between the first browsing window and the second browsing window as a web search path in the VR space; and
providing a function for editing the search link relation included in the web search path, wherein the search link relation indicates a connection between the interested object of the web page displayed on the first browsing window and the second browsing window,
wherein the providing the function for editing the search link relation comprises
cutting at least part of the search link relation in response to receiving a gesture for cutting the at least part of the search link relation from the user; and
executing a function for closing the second browsing window associated with the at least part of the search link relation.

2. The method of claim 1, wherein rendering the web page comprises a function for storing information corresponding to at least some search path included in the web search path selected by using the function for editing the search link relation.

3. The method of claim 1, further comprising obtaining, by the at least one processor, a unique URL for the interested object in a communication environment between agents through the VR space and delivering the interested object to a counterpart agent.

4. The method of claim 1, further comprising providing, by the at least one processor, output results for a counterpart agent in a communication environment between agents through the VR space by converting the output results into a format desired by a counterpart agent.

5. The method of claim 1, wherein displaying the area for the user input comprises selecting the tangible object in the web page by using a tag breakpoint for an individual object unit.

6. The method of claim 1, further comprising providing, by the at least one processor, a focus movement function for moving a focus to a location, corresponding to an input focus of a user, through auto-focusing in response to a movement of the input focus within an area corresponding to the tangible object.

7. The method of claim 6, wherein providing the at least one of the functions comprises performing the auto-focusing by using a metadata tag including priority of an input for a tag capable of a user input.

8. The method of claim 6, wherein providing the focus movement function comprises providing an auto-complete function for input information according to the input focus.

9. The method of claim 1, wherein the cutting comprises cutting the at least part of the search link relation in response to receiving the gesture and a confirmation for cutting the at least part of the search link relation from the user.

10. The method of claim 1, wherein the second browsing window comprises a plurality of second browsing windows, and
wherein the executing the function for closing comprises, in response to receiving a selection from the user,
closing, among the second browsing windows, at least first one of second browsing window associated with a previous search path with respect to the at least part of the search link relation, or
closing, among the second browsing windows, at least second one of second browsing window associated with a subsequent search path with respect to the at least part of the search link relation.

11. A computer device comprising:
at least one processor configured to execute computer-readable instructions included in a memory,
wherein the at least one processor is configured to:
render, in a virtual reality (VR) space, a web page including a tangible object,
display, on a first browsing window displaying the web page, an area for a user input as an area corresponding to a corresponding tangible object with respect to tangible objects, and
display, on at least one second browsing window as another browsing window in the VR space, an interested object according to the user input among the tangible objects by separating the interested object from the web page,
wherein the at least one processor is configured to
dispose the first browsing window displaying the web page and the second browsing window displaying the interested object in individual browsing windows in the VR space, respectively;
track and visualize a search link relation between the first browsing window and the second browsing window as a web search path in the VR space; and
provide a function for editing the search link relation included in the web search path,
wherein the search link relation indicates a connection between the interested object of the web page displayed on the first browsing window and the second browsing window,
wherein the at least one processor configured to
cut at least part of the search link relation in response to receiving a gesture for cutting the at least part of the search link relation from the user; and
execute a function for closing the second browsing window associated with the at least part of the search link relation.

12. The computer device of claim 11, wherein the at least one processor provides a function for storing information corresponding to at least some search path included in the web search path selected by using the function for editing the search link relation.

13. The computer device of claim 11, wherein the at least one processor obtains a unique URL for the interested object in a communication environment between agents through the VR space and delivering the interested object to a counterpart agent.

14. The computer device of claim 11, wherein the at least one processor outputs output results for a counterpart agent in a communication environment between agents through the VR space by converting the output results into a format desired by a counterpart agent.

15. The computer device of claim 11, wherein the at least one processor configured to
cut the at least part of the search link relation in response to receiving the gesture and a confirmation for cutting the at least part of the search link relation from the user.

16. The computer device of claim 11, wherein the second browsing window comprises a plurality of second browsing windows, and
wherein the at least one processor configured to, in response to receiving a selection from the user,
close, among the second browsing windows, at least first one of second browsing window associated with a previous search path with respect to the at least part of the search link relation, or
close, among the second browsing windows, at least second one of second browsing window associated with a subsequent search path with respect to the at least part of the search link relation.

* * * * *